US008335796B2

(12) United States Patent
Maeda et al.

(10) Patent No.: US 8,335,796 B2
(45) Date of Patent: Dec. 18, 2012

(54) RECIPE PROVIDING SYSTEM AND METHOD THEREOF

(75) Inventors: Hiroki Maeda, Osaka (JP); Tatsuo Inoue, Osaka (JP); Kazuaki Hiraga, Inagi (JP)

(73) Assignees: Panasonic Corporation, Osaka (JP); Dentsu, Inc., Tokyo (JP)

( * ) Notice: Subject to any disclaimer, the term of this patent is extended or adjusted under 35 U.S.C. 154(b) by 813 days.

(21) Appl. No.: 10/905,048

(22) Filed: Dec. 13, 2004

(65) Prior Publication Data
US 2005/0192869 A1    Sep. 1, 2005

Related U.S. Application Data

(63) Continuation of application No. PCT/JP03/03949, filed on Mar. 28, 2003, now abandoned.

(30) Foreign Application Priority Data

Jun. 13, 2002 (JP) ................................ 2002-172478

(51) Int. Cl.
*G06F 17/30* (2006.01)
(52) U.S. Cl. ........................................ 707/778; 707/829
(58) Field of Classification Search .................. 707/104, 707/3, 778, 829; 700/90; 345/700; 705/13; 709/202
See application file for complete search history.

(56) References Cited

U.S. PATENT DOCUMENTS

| | | | |
|---|---|---|---|
| 5,317,134 A | | 5/1994 | Edamura |
| 5,960,440 A * | | 9/1999 | Brenner et al. ............. 707/104.1 |
| 6,180,934 B1 * | | 1/2001 | Ishizaki et al. ................ 219/720 |
| 6,381,614 B1 * | | 4/2002 | Barnett et al. ............. 707/104.1 |
| 6,757,673 B2 * | | 6/2004 | Makus et al. ..................... 707/3 |
| 2001/0025279 A1 * | | 9/2001 | Krulak et al. ..................... 707/3 |
| 2002/0029149 A1 * | | 3/2002 | Nishina .............................. 705/1 |
| 2002/0059311 A1 * | | 5/2002 | Nishina ......................... 707/200 |
| 2002/0171674 A1 * | | 11/2002 | Paris ............................. 345/700 |

FOREIGN PATENT DOCUMENTS

| | | |
|---|---|---|
| JP | 05-079634 | 3/1993 |
| JP | 5-79634 | 3/1993 |
| JP | 09-026952 | 1/1997 |
| JP | 9-26952 | 1/1997 |
| JP | 2000-067029 | 3/2000 |
| JP | 2000-316492 | 11/2000 |

(Continued)

OTHER PUBLICATIONS

Notice of Translation of Translation of the International Preliminary Examination Report (Mar. 3, 2005).

(Continued)

*Primary Examiner* — Sherief Badawi
(74) *Attorney, Agent, or Firm* — Westerman, Hattori, Daniels & Adrian, LLP

(57) ABSTRACT

A recipe providing system and a recipe providing method for presenting a suitable recipe that matches to a user request on specific foodstuff basis and/or specific cooking process basis. A recipe element storing unit stores a recipe element data related to recipes. The recipe elements are hierarchized according to cooking process of one recipe and each of the recipe element has link information to a finished-dish for which the recipe element is used. A recipe generating means retrieves/extracts recipe element data from the recipe element storing unit in accordance with user's recipe request, and generates a recipe. A recipe sending means sends the recipe generated by the recipe generating means to users.

15 Claims, 22 Drawing Sheets

FOREIGN PATENT DOCUMENTS

| | | |
|---|---|---|
| JP | 2002-56180 | 2/2002 |
| JP | 2002-056180 | 2/2002 |
| JP | 2002-63178 | 2/2002 |
| JP | 2002-063178 | 2/2002 |
| JP | 2002-92120 | 3/2002 |
| JP | 2002-092120 | 3/2002 |

OTHER PUBLICATIONS

Office Action for Patent Application No. 2004-513980, Japanese Translation, Apr. 13, 2009, pp. 1-4.

Office Action for Patent Application No. 2004-513980, Japanese Translation, Jan. 13, 2009, pp. 1-4.

Office Action for 03813550.7 Chinese Translation, Jan. 16, 2009, pp. 1-6.

Chinese Office Action dated May 12, 2010, issued in corresponding Chinese Patent Application No. 038135507.

Sep. 11, 2009 Office Action Issued in Corresponding Chinese Application.

JP Office Action (Translation), Sep. 9, 2008, pp. 1-4.

* cited by examiner

① READ OUT BASE CANDIDATE
  (FOODSTUFFS, KITCHEN EQUIPMENT)

② SELECT BASE (KITCHEN EQUIPMENT) BY USER

③ GENERATE A RECIPE BASED ON
  SELECTED BASE (FOODSTUFFS, KITCHEN EQUIPMENT)

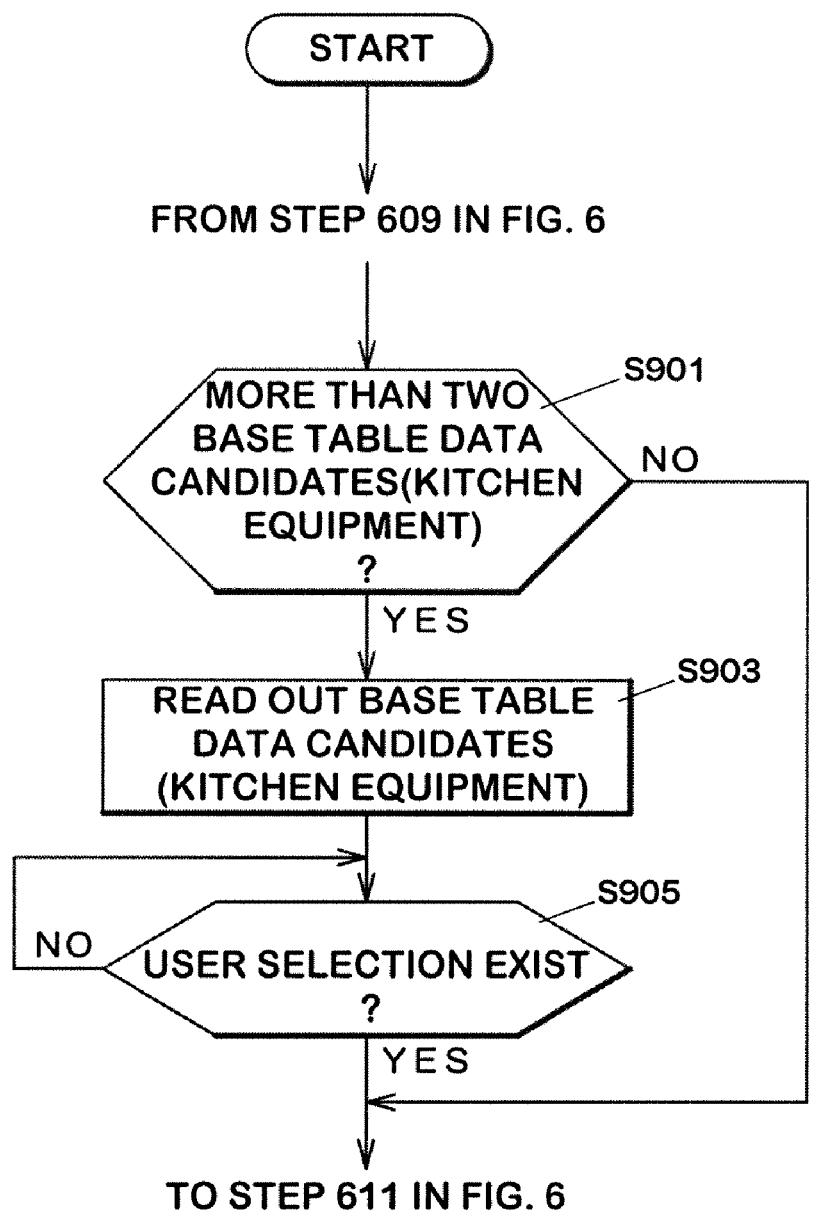

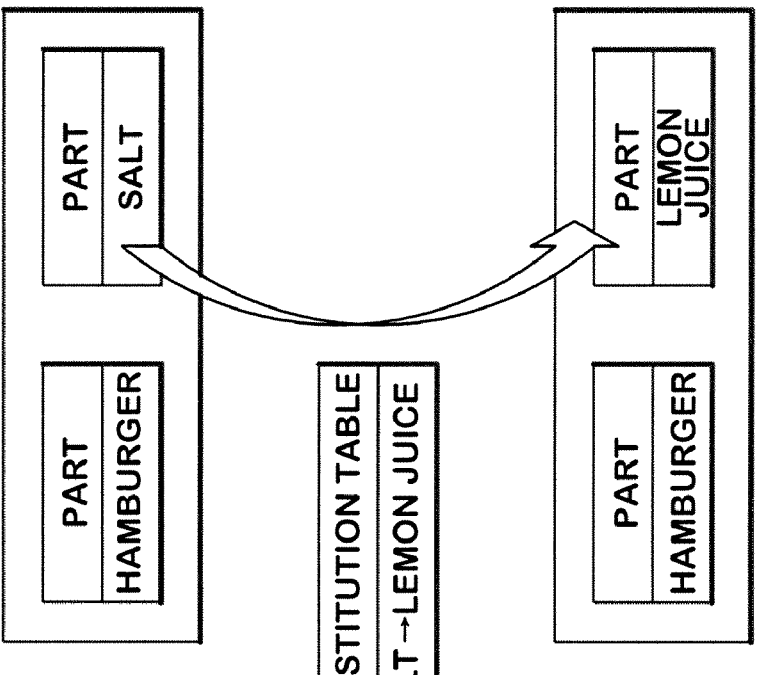

FIG.15

70: FINISHED-DISH TABLE DATA

FINISHED-DISH NAME: SPAGHETTI WITH MEAT SAUCE
FINISHED-DISH NAME: HAMBURGER COOKED IN TOMATO SAUCE
FINISHED-DISH NAME: JAPANESE STYLE HAMBURGER WITH CITRUS VINEGAR
FINISHED-DISH NAME: HAMBURGER WITH GRATED RADISH

| FILTERING INFORMATION | CORPORATION INFORMATION | LOCAL INFORMATION | COOKING TIME | NUTRITION VALUE (FOR ONE PERSON) | CONTENTS LINK |
|---|---|---|---|---|---|
| (DEFAULT) | | — | | | D15101 |
| | RESTAURANT X | | | | D15102 |
| | HOTEL Z | | | | D15103 |
| | AMOUNT (GRAM FOR FOUR PERSONS) | CALORIE (kcal FOR ONE PERSON) | | | |
| (DEFAULT) | 480 | 400 | | | — |
| RESTRICTIONS (LOW CHOLESTEROL) | 465 | 380 | | | — |
| REASONABLE AMOUNT OF INTAKE (LOW SALT) | 470 | 390 | | | — |

FIG. 16

72: PRODUCT TABLE DATA

PRODUCT NAME:WHITE SAUCE (COOKING)
PRODUCT NAME:FRIED RICE (STIR-FRYING)
PRODUCT NAME:HAMBURGER (STEWING)
PRODUCT NAME:HAMBURGER (GRILLING)

| FILTERING INFORMATION | CORPORATION INFORMATION | LOCAL INFORMATION | COOKING TIME | NUTRITION VALUE (FOR ONE PERSON) | CONTENTS LINK |
|---|---|---|---|---|---|
| (DEFAULT) | — | — | — | | C27401 |
| | | | QUICK | | C27402 |
| | | | SLOW | | C27403 |

| TABLE LINK INFORMATION | AMOUNT (GRAM FOR FOUR PERSONS) | CALORIE (kcal FOR ONE PERSON) | | | CONTENTS PRIORITY (ORDER)/TOTAL NUMBER) |
|---|---|---|---|---|---|
| <FINISHED-DISH NAME> | | | | | |
| HAMBURGER WITH GRATED RADISH | 420 | 360 | | | 2/2 |
| HAMBURGER COOKED IN TOMATO SAUCE | 400 | 340 | | | 2/2 |
| HAMBURGER WITH TOMATO SAUCE AND FRIED POTATO | 420 | 360 | | | 3/3 |

FIG. 17

PART NAME: GARLIC (SLICE)

PART NAME: SHREDDED CABBAGE (FINELY-SLICED CABBAGE)

PART NAME: MINCED ONION

PART NAME: HAMBURGER (KNEADING)    74: PART TABLE DATA

| FILTERING INFORMATION | CORPORATION INFORMATION | LOCAL INFORMATION | AMOUNT (GRAM FOR FOUR PERSONS) | CALORIE (kcal FOR ONE PERSON) | COOKING TIME | CONTENTS LINK |
|---|---|---|---|---|---|---|
| (DEFAULT) | — | — | — | — | — | B10501 |
|  | FOOD CORPORATION Y |  |  |  | QUICK | B10502 |
|  |  |  |  |  | SLOW | B10503 |
|  |  |  |  |  |  | B10504 |
| ... | ... | ... | ... | ... | ... | ... |

| TABLE LINK INFORMATION |  |  |  | NUTRITION VALUE (FOR ONE PERSON) |  | CONTENTS PRIORITY (ORDER /TOTAL NUMBER) |
|---|---|---|---|---|---|---|
| <FINISHED-DISH NAME> |  |  |  |  |  |  |
| HAMBURGER WITH GRATED RADISH |  |  | 420 | 370 |  | — |
| HAMBURGER COOKED IN TOMATO SAUCE |  |  | 400 | 340 |  | — |
| HAMBURGER WITH TOMATO SAUCE AND FRIED POTATO |  |  | 420 | 370 |  | — |
| <PRODUCT NAME> |  |  |  |  |  |  |
| HAMBURGER (GRILLING) |  |  | 420 | 370 |  | 4/4 |
| HAMBURGER (STEWING) |  |  | 420 | 370 |  | 4/4 |

FIG. 18

76: BASE TABLE DATA

BASE NAME: PEPPER
BASE NAME: TOMATO
BASE NAME: GROUND PORK

| FILTERING INFORMATION (DEFAULT) | CORPORATION INFORMATION | LOCAL INFORMATION | AMOUNT (GRAM FOR FOUR PERSONS) | CALORIE (kcal FOR ONE PERSON) | COOKING TIME | NUTRITION VALUE (FOR ONE PERSON) | CONTENTS LINK |
|---|---|---|---|---|---|---|---|
| | COMPANY X FOR PROCESSED PORK | | | | | | A02501 |
| | SPECIAL PRICES | ORIGIN=Z | | | | | A02502 |
| | | | | | | | A02503 |
| | | | | QUICK | | | A02504 |
| | | | | SLOW | | | A02505 |
| TABLE LINK INFORMATION | | | | | | | CONTENTS PRIORITY (ORDER / TOTAL NUMBER) |
| <FINISHED-DISH NAME> | | | | | | | |
| HAMBURGER WITH GRATED RADISH | | | 400 | 320 | | | — |
| HAMBURGER COOKED IN TOMATO SAUCE | | | 390 | 310 | | | — |
| HAMBURGER WITH TOMATO SAUCE AND FRIED POTATO | | | 400 | 320 | | | — |
| DUMPLING (POT-STICKERS) AND VEGETABLE SOUP | | | 210 | 150 | | | — |
| <PRODUCT NAME> | | | | | | | |
| HAMBURGER (GRILLING) | | | 400 | 320 | | | — |
| HAMBURGER (STEWING) | | | 400 | 320 | | | — |
| DUMPLINGER (FRYING) | | | 210 | 150 | | | — |
| <PART NAME> | | | | | | | |
| HAMBURGER (FORMING/SHAPING) | | | 400 | 320 | | | 4/7 |
| HAMBURGER (KNEADING) | | | 400 | 320 | | | 4/7 |

FIG.19

BASE NAME: GRATER

BASE NAME: BEATER

BASE NAME: KITCHEN KNIFE

78: BASE TABLE DATA (FOR KITCHEN EQUIPMENT)

| FILTERING INFORMATION | CORPORATION INFORMATION | LOCAL INFORMATION | COOKING TIME | CONTENTS LINK |
|---|---|---|---|---|
| (DEFAULT) | CUTLER X | — | — | X01501 |
|  |  | ⋮ | ⋮ | X01502 |

TABLE LINK INFORMATION | CONTENTS PRIORITY (ORDER / TOTAL NUMBER)

| <FINISHED-DISH NAME> | | | | |
|---|---|---|---|---|
| HAMBURGER WITH GRATED RADISH | — | | | |
| HAMBURGER COOKED IN TOMATO SAUCE | — | | | |
| HAMBURGER WITH TOMATO SAUCE AND FRIED POTATO | — | | | |
| DUMPLING(POT-STICKERS) AND VEGETABLE SOUP | — | | | |
| <PRODUCT NAME> | | | | |
| HAMBURGER (GRILLING) | — | | | |
| HAMBURGER (STEWING) | — | | | |
| DUMPLINGER (FRYING) | — | | | |
| <PART NAME> | | | | |
| HAMBURGER (FORMING/SHAPING) | 3/7 | | | |
| HAMBURGER (KNEADING) | 3/7 | | | |

FIG.20A

```
CONTENTS ID:A025
  BASE NAME:GROUND PORK

<MOVIE INFORMATION>
①MOVIE FILE=A02501.wmv
```
— 80

FIG.20B

```
CONTENTS ID:B105
  PART NAME: HAMBURGER (KNEADING)

<PART COOKING PROCESS>
 ① PUT GROUND MEAT, PINCH OF SALT, AND WATER INTO BOWL
    AND KNEAD THEM UNTIL VISCOUS.
 ②KNEAD MORE AND SEASON WITH SALT AND PEPPER.

<MOVIE INFORMATION>
①MOVIE FILE=B10501.wmv
```
— 81

FIG.20C

```
      CONTENTS ID:C274
PRODUCT NAME:HAMBURGER (GRILLING)

<PRODUCT COOKING PROCESS>
 ① PUT SALAD OIL INTO HEATED GRIDDLE AND GRILL HAMBURGER
    WITH MEDIUM HEAT UNTIL ONE SIDE OF HAMBURGER TURNS
    RICH GRILLED COLOR.
 ② REVERSE HAMBURGER, PUT COVER, AND BAKE CAREFULLY
    WITH LOW HEAT TO AVOID BURNING.
 ③ FINISH IF MEAT JUICE BECOME TRANSLUCENT.

<MOVIE INFORMATION>
①MOVIE FILE=C27401.wmv
```
— 82

FIG.20D

```
         CONTENTS ID:D151
FINISHED-DISH NAME:HAMBURGER WITH GRATED RADISH

<ASSEMBLE PROCESS>
①DISHING UP

<PICTURE INFORMATION>
  PICTURE FILE=D15101.jpg
<MOVIE INFORMATION>
①MOVIE FILE=D15101.wmv
```
— 83

FIG.20E

```
CONTENTS ID:X015
  BASE NAME: KITCHEN KNIFE

<MOVIE INFORMATION>
① MOVIE FILE=X01501.wmv
```
— 84

FIG.21

90: SUBSTITUTION DATA

| HIERARCHY | RETRIEVE KEY INFORMATION | | SUBSTITUTION SUBJECT TABLE DATA | SUBSTITUTION TARGET TABLE DATA |
|---|---|---|---|---|
| PRODUCT | RESTRICTIONS | LOW CHOLESTEROL | IRON EQUIPMENT | TEFLON COATED EQUIPMENT |
| ... | ... | ... | ... | ... |
| PART | REASONABLE AMOUNT OF INTAKE | LOW CALORIE | DUMPLING WRAPS (SKIN FOR POT-STICKERS) | RADISH SLICES (SLICED RADISH (DAIKON)) |
| | RESTRICTIONS | LOW SALT | SALT | LEMON JUICE |
| ... | ... | ... | ... | ... |
| BASE | RESTRICTIONS | LOW SALT | SALT | LEMON |
| | | | | |

RECIPE PROVIDING SYSTEM AND METHOD THEREOF

CROSS-REFERENCE TO RELATED APPLICATIONS

The present application is a continuation patent application of International Application No. PCT/JP03/03949 filed 28 Mar. 2003 which claims priority to Japanese Application No. 2002-172478 filed 13 Jun. 2002. Said applications are expressly incorporated herein by reference in their entireties.

FIELD OF THE INVENTION

The present invention relates to a system and method for presenting recipe and more particularly to a system and method for providing suitable recipes for users. Moreover, the present invention includes technologies for constructing database structure that defines a relationship among interrelated data and for utilizing process for the database.

DESCRIPTION OF THE RELATED ART

One unit of recipe data as one entry in a database utilized in the conventional system generally covers one overall cooking process from presenting foodstuffs to suggested dishing up. An example of utilizing such recipe data, Japanese Patent Laid-Open No. 2000-67029 discloses a device for menu assistance that retrieves most suitable menu from registered menu information based on a conditions set by user, and presents the retrieved menu to the user.

SUMMARY OF THE INVENTION

One of the database construction technologies according to the present invention will be given with illustrations along with related arts.

Conventionally, for constructing database regarding both a finished product and its parts, one entry data stored in the database has been designed to include the finished product information together with the parts information as its components.

However, when various finished products can be obtained by utilizing one specific part in combination with other parts, there should be many duplicate part information in the database. That situation often occurs when handling, for example, the cooking recipe information where the number of the finished product data is generally greater than that of the part data. This data duplication has been made redundancy of database management effort.

In order to solve above-mentioned problem, one feature of the present invention is to construct separate data for the finished product information and for the part information as higher hierarchy data and lower hierarchy data, respectively.

Moreover, other feature of the present invention is to record associate information on the part data (lower hierarchy data) so that the part data to be correlated with the finished product data (higher hierarchy data). On the contrary, if the finished product and the part are constructed as separate data, those skilled in the art would record associate information on the finished product data so that the finished product data to be correlated with the part data. The advantages for that database structure according to the present invention will follow.

Next, related arts regarding the recipe data providing will be given from the viewpoint of the above-mentioned database construction technology.

Conventional computer systems for transmitting recipe data suited to user-selected cooking category have been operated by utilizing the Internet or the Internet-ready home electric appliances.

One unit of recipe data as one entry in a database utilized in the conventional system generally covers one overall cooking process from presenting foodstuffs to suggested dishing up. An example of utilizing such recipe data, Japanese Patent Laid-Open No. 2000-67029 discloses a device for menu assistance that retrieves most suitable menu from registered menu information based on a condition set by user, and presents the retrieved menu to the user.

However, when the database is constructed in the conventional way so that one unit of recipe data covers one overall cooking process (i.e. cooking process integrated database), the following problems can be raised.

(problem 1) In the conventional "cooking process integrated database", all elements included in a recipe data are fixed. Therefore, it would be difficult to respond to requests for variations on the elements (e.g. foodstuffs or kitchen equipment (or kitchen utensils)).

As an example of such variation request, there is a need for a recipe variation in which an original foodstuff is changed to another one (e.g. "salt" as a foodstuff is changed to "lemon juice" as an alternative to the salt.).

(problem 2) In the conventional "cooking process integrated database", one unit of recipe data covers one overall cooking process from presenting foodstuffs to suggested dishing up. Therefore, it would be difficult to respond to requests for selecting and presenting only specific process as an element of the recipe.

As an example of such request, there is a need for presenting specific cooking process information on a part of interest from the recipe data (e.g. cooking process information on "Hamburger (or patted hamburger mixture)" (i.e. pre-boiled Hamburger material) included in a finished-dish recipe data of "Hamburger".

The objective of the present invention is to solve the problems on utilizing the conventional "cooking process integrated database". More specifically, one objective of the present invention is to provide a recipe providing system and a recipe providing method for presenting a suitable recipe that matches to a user request on specific foodstuff basis and/or specific cooking process basis. The invention includes the following:

(1) A recipe providing system in accordance with the present invention comprising a recipe providing device for providing a recipe, and a client device being interconnected to the recipe providing device. The client device includes means for requesting recipe data to the recipe providing device by presenting recipe requirement and means for receiving recipe data from the recipe providing device. The recipe providing device includes a recipe element data storing unit for storing plural of recipe element data to be utilized for generating recipe data, means for generating recipe data by retrieving the recipe element data from the recipe element data storing unit based on the recipe requirement presented by the client device, and means for transmitting the generated recipe data to the client device. The plural of recipe element data are arranged in at least two hierarchy data, said two hierarchy data are composed of recipe element data of finished-dish as a higher hierarchy and recipe element data for foodstuff as a lower hierarchy; and said recipe element data for foodstuff has link information to more than one recipe element data of finished-dish for which the foodstuff is used.

The plural of recipe element data are grouped on the basis of the finished-dish name (i.e. Each of recipe element data are sorted on the basis of the finished-dish name). Therefore, the recipe data generating means is capable of completing a recipe by accessing the finished-dish name information, and retrieving/extracting recipe element data (i.e. part information of a recipe) linked with the finished-dish table data (or recipe element data correlated with the finished-dish).

The recipe generating means is capable of completing a recipe by selecting recipe element data that represents element handled as a cooking subject during cooking process, or assembling the selected recipe element data. Therefore, the recipe providing system in accordance with the present invention is capable of providing different recipe variation by substituting/changing recipe element data included in a recipe.

The recipe providing system is capable of providing a highly-customized recipe that meets user's request.

(2) A recipe providing device in accordance with the present invention provides a recipe. The recipe providing device includes a recipe element data storing unit for storing plural of recipe element data to be utilized for generating recipe data, means for generating recipe data by retrieving the recipe element data from the recipe element data storing unit based on an inputted recipe requirement, and means for outputting the generated recipe data. The plural of recipe element data are arranged in at least two hierarchy data, and said two hierarchy data are composed of recipe element data of finished-dish as a higher hierarchy and recipe element data for foodstuff as a lower hierarchy.

The recipe generating means is capable of completing a recipe by selecting recipe element data that represents element handled as a cooking subject during cooking process, or assembling the selected recipe element data. Therefore, the recipe providing system in accordance with the present invention is capable of providing different recipe variation by substituting/changing recipe element data included in a recipe.

(7) The plural of recipe element data in accordance with the present invention includes recipe element data for an intermediate foodstuff as an intermediate hierarchy corresponding at the halfway of the cooking process of going from the foodstuff to the finished-dish. Each hierarchy recipe element data has link information to other higher hierarchy recipe element data.

The recipe generating means is capable of completing not only a common recipe including the cooking process from start to finish but also an intermediate foodstuff recipe specifying only limited to intermediate cooking process.

(8) The plural of recipe element data in accordance with the present invention includes recipe element data for kitchen utensils.

(9) The recipe requirement in accordance with the present invention includes finished-dish name information.

(10) The recipe element data in accordance with the present invention includes information indicating a local feature of the recipe element. The recipe requirement in accordance with the present invention includes a local information. The recipe generating means in accordance with the present invention retrieves the recipe element data by further considering both the information indicating a local feature and the local information in the recipe requirement data, and generates the recipe data from the retrieved recipe element data.

(11) The recipe element data in accordance with the present invention includes information indicating a vendor of the recipe element. The recipe requirement in accordance with the present invention includes vendor information. The recipe generating means in accordance with the present invention retrieves the recipe element data by further considering both the information indicating a vendor and the vendor information, and generates the recipe from the retrieved recipe element data.

(12) The recipe element data in accordance with the present invention includes information indicating a seasonality of the recipe element. The recipe generating means in accordance with the present invention retrieves the recipe element data by further considering the information indicating a seasonality, and generates the recipe from the retrieved recipe element data.

(13) The recipe element data in accordance with the present invention includes cooking process information of the recipe element that represents the cooking process by means of sound and/or picture.

(14) The recipe element data in accordance with the present invention includes a process sequence information that represents process sequence among plural of recipe elements in the case in which those plural of recipe elements are on the same hierarchy and they have link information to same higher hierarchy recipe element data.

(15) The recipe requirement in accordance with the present invention includes substitution rule information. The recipe providing device in accordance with the present invention includes a recipe element substitution data storing unit for storing recipe element substitution data. The recipe generating means in accordance with the present invention retrieves the recipe element data based on the recipe requirement, substitutes the retrieved recipe element data for other recipe element data based on the substitution rule information and the recipe element substitution data, and generated the recipe data from the retrieved and substituted recipe element data.

The recipe generating means is capable of generating a recipe including recipe element data that is limited or specified by utilizing the substitution rule information. Therefore, for example, when utilizing user's illness information, reasonable amount of energy, allergenic foods, restrictions (or contraindicate), or the like (i.e. body condition information) as the substitution rule information, the recipe generating means is capable of generating a suitable recipe that is acceptable to those body conditions by substituting recipe element data.

The term "recipe" in the present invention includes information related to "how to cook" (or cooking method). For example, the term "recipe" includes information representing foodstuff, material, kitchen equipment, cooking method, cooking time, nutritional value of food, or the like.

The term "element" in the present invention includes a subject or an event handled by a cook at each stage of the cooking process. For example, the term "element" includes an eating utensil (or plate), kitchen equipment, foodstuff, pre-treated foodstuff, processed or assembled foodstuff, dishing up (or arrangement on the plate for foodstuff), or the like.

The term "recipe requirement" in the present invention includes a consideration matter for selecting a recipe or a content of recipe such as food name, finished-dish name, user age, chronic illness, reasonable amount of energy, required nutrient, cooking time, or user's chewing power. More specifically, the term "recipe requirement" includes user input information stored in the client data 400 (refer to FIG. 14).

The term "link information" in the present invention includes association means (e.g. reference information). More specifically, the term "link information" includes association information that has executing instruction for certain processing (e.g. link information described as Hypertext Markup Language (HTML)) such as information for designating connecting target, or information for loading a link target file. The term "link information" also includes reference information that does not have the executing instruction. Consequently, the term "recipe element data of material has link information to more than one recipe element data of finished-dish for which the material is used" includes not only the case in which the recipe element data of material is associated with the recipe element data of finished-dish, but also the case in which the recipe element data of material has a list of finished-dish name (or reference information for the recipe element data of finished-dish).

The term "substitution rule information" in the present invention includes a consideration matter for selecting a recipe or a content of recipe such as reasonable amount of intake energy, intensity of daily activity, constitutional predisposition, allergenic foods, restrictions of food ingredients, symptoms of any disease, or pregnancy status.

The term "cooking process" in the present invention includes information related to cooking method. For example, the term "cooking process" includes amount information of food ingredient or cooking method information.

The features of the present invention can be described broadly as set forth above. The structures and characteristics of the present invention will be apparent from the following detailed description of the invention together with those features, effects, and drawings.

BRIEF DESCRIPTION OF THE DRAWINGS

FIGS. 7A, 7B, and 7C illustrate an example of a monitor display of the client computer during the recipe generating process according to the first embodiment.

FIG. 9 illustrates a program flowchart for the recipe generating process portion according to the second embodiment.

FIG. 11 illustrates an overview representing the recipe generating process portion according to a third embodiment.

FIG. 15 illustrates a configuration example of finished-dish table data stored in a recipe database.

FIG. 16 illustrates a configuration example of product table data stored in the recipe database.

FIG. 17 illustrates a configuration example of part table data stored in the recipe database.

FIG. 18 illustrates a configuration example of base table data stored in the recipe database.

FIG. 19 illustrates a configuration example of base table data (for kitchen equipment) stored in the recipe database.

FIGS. 20A, 20B, 20C, 20D, and 20E illustrate a configuration example of contents stored in a contents database.

FIG. 21 illustrates a configuration example of substitution data.

DESCRIPTION OF THE PREFERRED EMBODIMENTS

Figure 1:
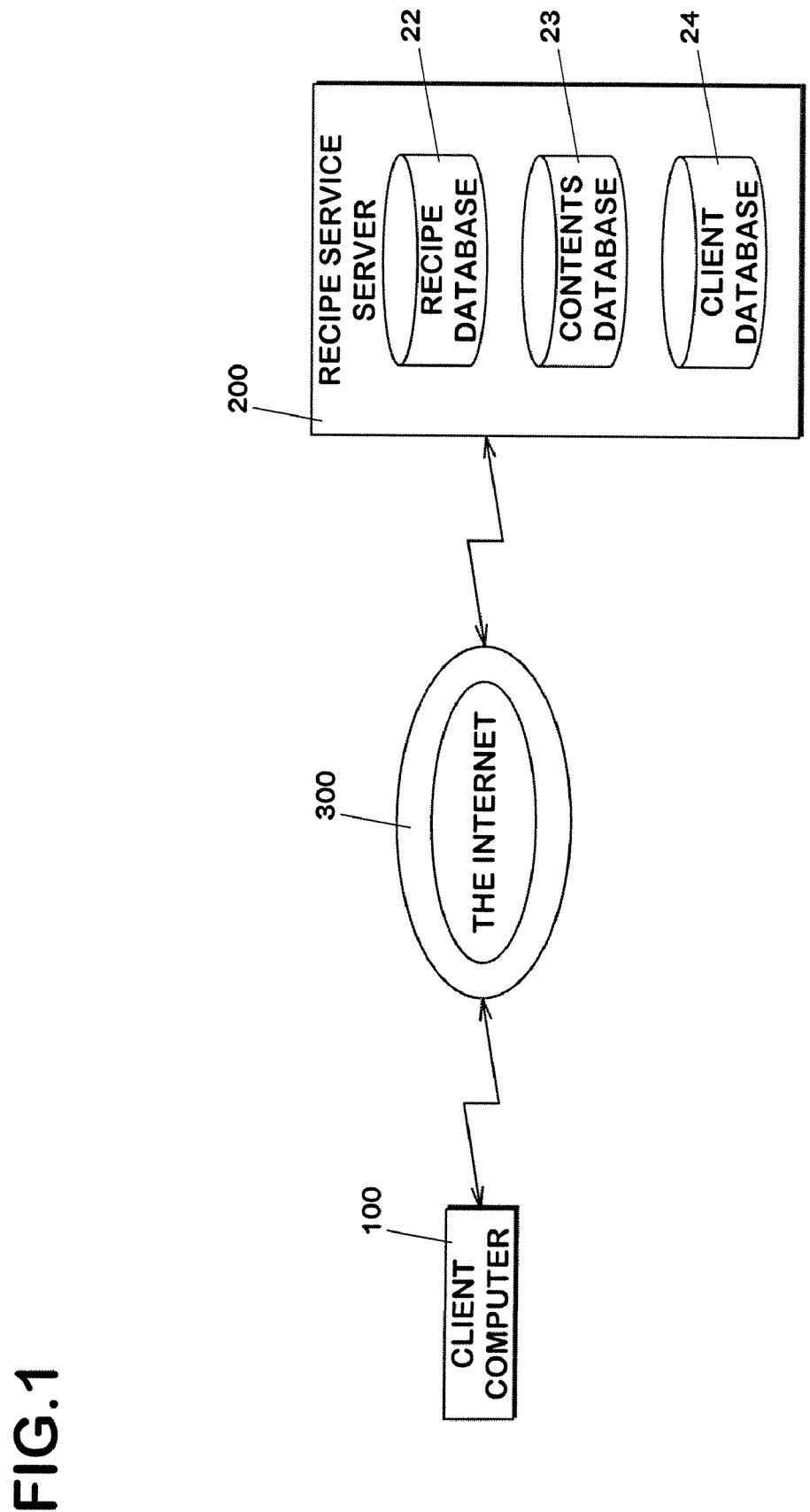
FIG. 1 illustrates a system architecture of a recipe providing service system according to an embodiment of the present invention.

Table of Contents for the Embodiments
1. An overview of the system and hardware configuration
2. Database configuration
3. Embodiments
4. An overview of the data table configuration
5. First embodiment
6. Second embodiment (handling "base" table data for kitchen equipment as an embodiment)
7. Third embodiment (executing substituting process as an embodiment)
8. Advantages of the embodiments
9. Other embodiments
1. An overview of the system and hardware configuration Embodiments according to the present invention will be given below together with the drawings. A recipe providing service system according to the recipe providing system of the present invention includes the recipe service server 200 according to the recipe providing device and the client computer 100 according to the client device that are connected to the recipe service server 200 through the Internet 300.

The recipe service server 200 stores the recipe database 22, the contents database 23, and the client database 24.

Figure 2:
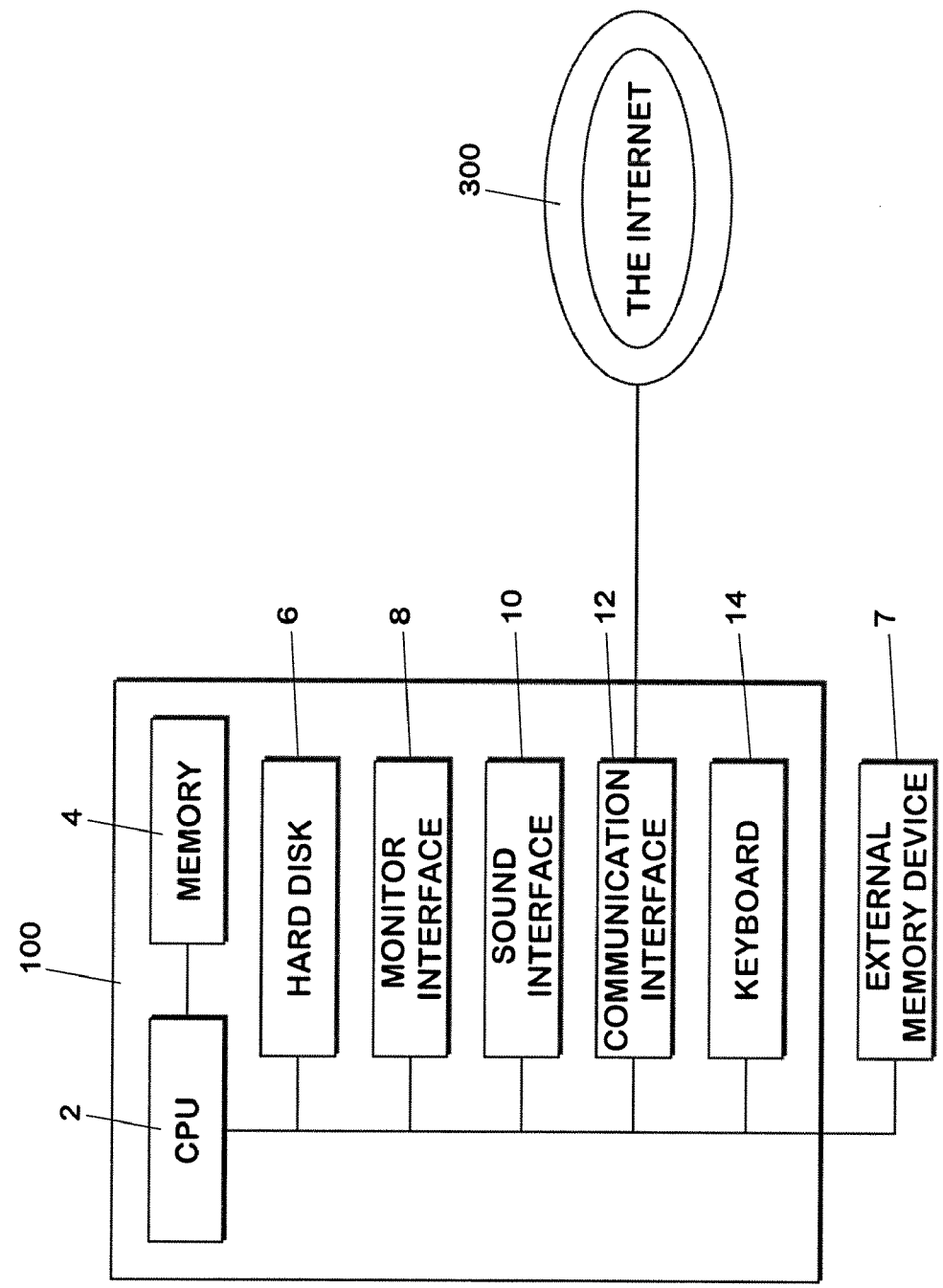
FIG. 2 illustrates a hardware configuration example for a client computer.

FIG. 2 illustrates a hardware configuration example of the client computer 100. The client computer 100 includes CPU 2, memory 4, hard disk 6, monitor interface 8, sound interface 10, communication interface 12, and keyboard 14, and external memory device 7.

The CPU 2 controls operations of the client computer 100. The hard disk 6 stores a computer program for controlling the client computer 100. The memory 4 acts as a storage area for data processing performed by the CPU 2. The monitor interface 8 and sound interface 10 output sounds, texts, and pictures (i.e. freeze-frame pictures or moving pictures) to the client computer 100. The client computer 100 is connected to the Internet 300 through the communication interface 12.

Figure 3:
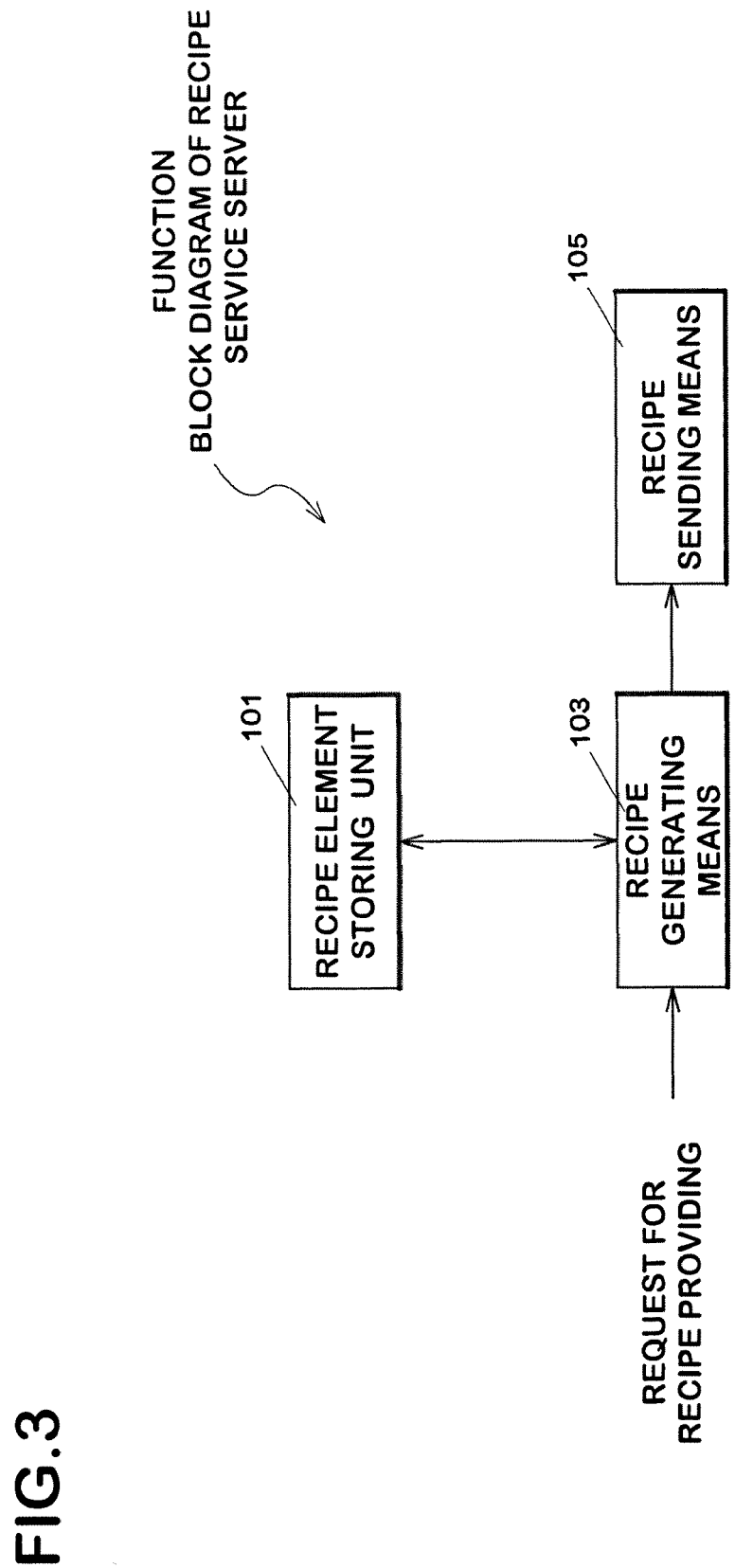
FIG. 3 illustrates a function block diagram of a recipe service server.

FIG. 3 illustrates an configuration overview of the recipe service server 200. The recipe element storing unit 101 is to store data related to recipes. The recipe generating means 103 is to retrieve and extract recipe element data from the recipe element storing unit 101 in accordance with user's recipe request. The recipe sending means 105 is to send the recipe generated by the recipe generating means 103 to users.

Figure 4:
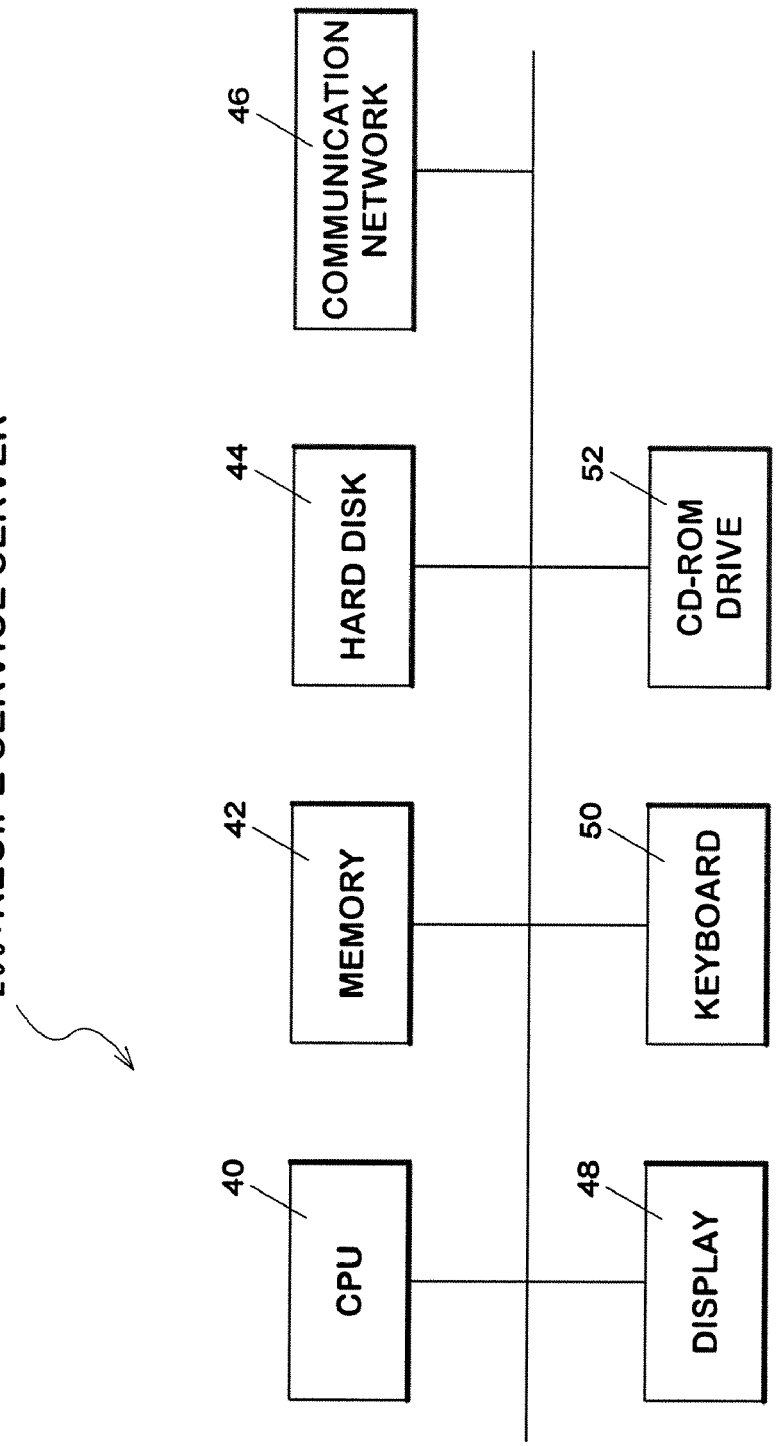
FIG. 4 illustrates a hardware configuration example for the recipe service server.

FIG. 4 illustrates a hardware configuration example of the recipe service server 200 in FIG. 3 by use of a CPU 40. The recipe service server 200 includes CPU 40, memory 42, hard disk 44, communication network 46, display 49, keyboard 50, and CD-ROM drive 52.

The CPU 40 controls operations of the recipe service server 200 as well as executes a recipe generating process. The hard disk 44 stores a computer program for controlling the recipe service server 200, as well as the recipe database 22, contents database 23, and client database 24. The memory 42 acts as a storage area for data processing performed by the CPU 40. The recipe service server 200 is connected to the Internet 300 through the communication interface 46.

In the embodiments, examples of operating systems for the client computer 100 and recipe service server 200 are Microsoft's Windows™ XP, or the like. In the embodiments, the computer program works with the operating system. For modified embodiments, the computer program works without the operating system.

2. Database Configuration 2-1. Client Database

Figure 14:
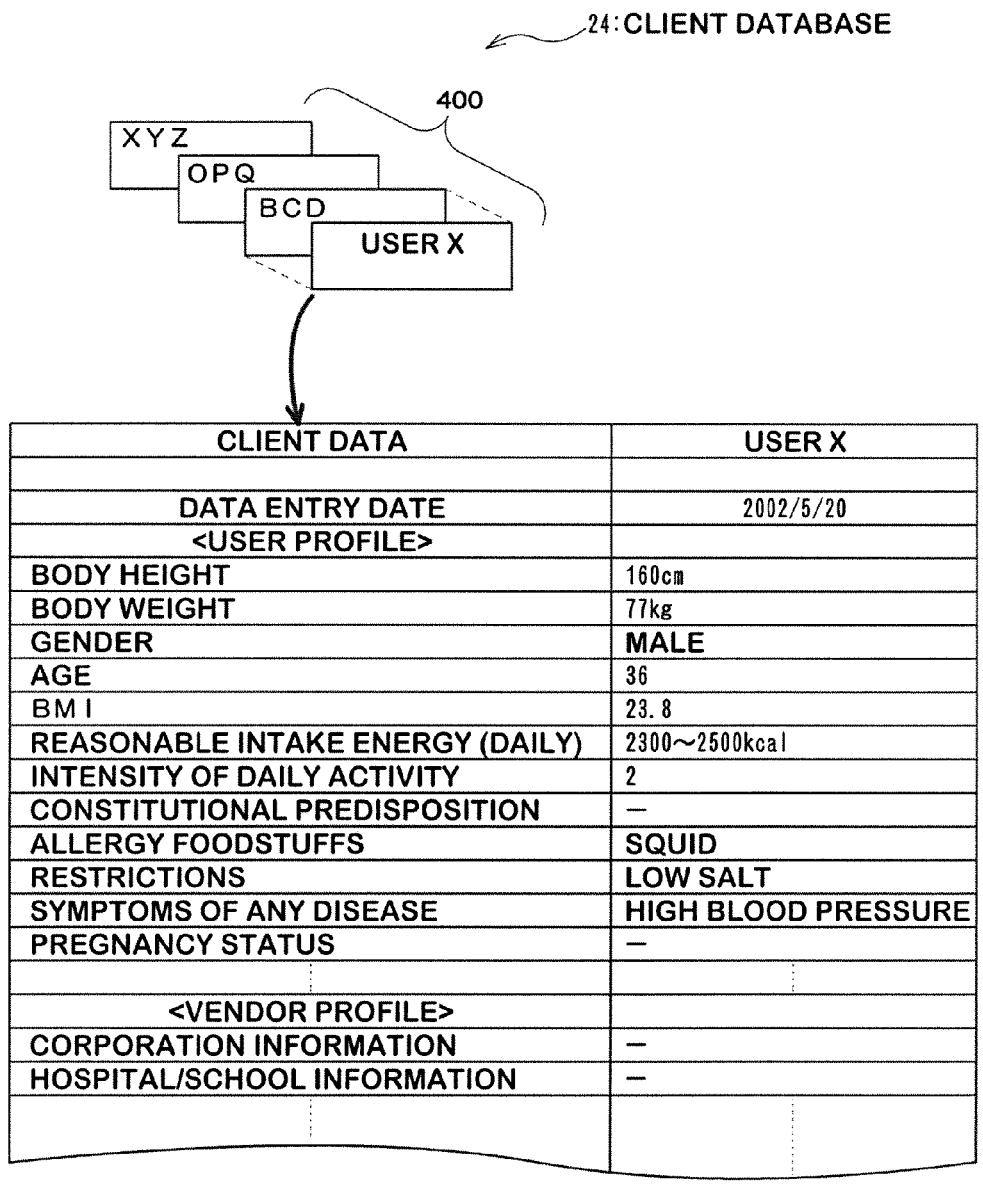
FIG. 14 illustrates a configuration example of a client database according to an embodiment.

FIG. 14 illustrates a configuration example of the client database 24. The client database 24 maintains client data 400 on individual user information of the system.

Each of the client data 400 mainly maintains two profile information. Those profile information includes user profile representing data for personal user and vendor profile representing data for group user (including corporate user).

Each of the profile information is used for specifying user (s). In certain embodiments (e.g. third embodiment), each of the profile information acts as a retrieve key information on the recipe generating process.

The contents of each profile information includes the following:

The vendor profile includes corporate information (e.g. food manufacturer, beverage manufacturer, business enterprise in food service industry, or the like), hospital information, school information. For example, the system is capable of generating recipe for specific business corporation, hospital diet, or recipe for school meals by utilizing those vendor profile. The term "vendor" includes food provider(s) or their contact(s) (i.e. consumer or user). For example, the food provider includes information of: business corporation, food manufacturer, beverage manufacturer, manufactured goods, advertisement, or sales promotion. Meanwhile, the contact of the food provider includes information of: hospital, or school.

The user profile includes body height, body weight, gender, age, BMI (i.e. body-mass index: BMI can be expressed by the following equation, BMI=body weight (kg)/(body height (m)×body height (m)), reasonable amount of intake energy per one day, intensity of daily activity (i.e. grouped intensity of daily activity based on user's energy consumed), constitutional predisposition, allergenic foods, restrictions of food ingredients, symptoms of any disease, or pregnancy status. For example, the system is capable of generating a recipe not greater than specific calories based on the user profile.

The followings are details of user profile items. BMI and reasonable amount of intake energy can be directly inputted by a user of the client computer 100. In the embodiment, alternatively, the CPU 40 of recipe service server 200 determines the BMI and/or reasonable amount of intake energy based on inputted information of body height or the like.

The reasonable amount of intake energy includes information about calories that are suitable for user's intake per one meal. For example, the CPU is capable of determining a standard amount of energy (or standard calories) based on the BMI value, age, or the like. In addition, the CPU can modify the determined amount of energy information by increasing the amount for a thin person, and/or reducing the amount for a heavy person. In modified embodiments, users input the information of reasonable amount of intake energy into the system. The standard amount of energy can be stored in the hard disk 44 by correlating with some of or all of the BMI value, body height, body weight, and age.

In modified embodiments, based on inputted client information history (i.e. data history) of a user in the system, the reasonable amount of intake energy can be determined by further considering another factor such as time-based variation trend of user's body weight based on the client information history. By doing this, the system can determine the reasonable amount of intake energy that is not stringent for users. In modified embodiments, as a history information, amount of energy of food that a user has already eaten in same day or in past can be stored in the client data 400. Also, the reasonable amount of intake energy can be determined by further considering a factor of user profile such as information about "growing" user, "woman" user, or the like. In addition, since the result of intake energy amount from a meal may vary based on extent of user's chewing power or time for taking a meal, the reasonable amount of intake energy can be determined by considering a factor of information about the time for taking a meal etc. The reasonable amount of intake energy can be determined by information about "percent of body fat" instead of the BMI value.

The profile information of client data 400 is not limited to above-mentioned items. In modified embodiments, the followings can be used as profile information of client data 400 and they can be modified by well-known techniques by those skilled in the art.

As the user profile, preference, chewing power, cooking skill, event information (e.g. athletic festival), necessity of baby food, budget, clinical record, hospital visit record, ideal body weight, or the like can be adopted.

As the vendor profile, statistical information of user preferences on recipe provided by corporation, products information about meals etc. offered by corporation, advertisement information with food ingredients, sales promotion information, cost information on food ingredients, storage life information on food ingredients, or the like can be adopted.

2-2. Recipe Database

The recipe database 22 includes "finished-dish" database, "product" database, "part" database, and "base" database. A recipe data can be composed of those four databases. In other words, whole cooking process of a recipe is divided in chronological order and the subject for each of the divided cooking process is maintained in each of four databases.

In the embodiments, each data for the subjects is maintained on "base table data", "part table data", "product table data", and "finished-dish table data", respectively. The data maintained on each table data corresponds to the term "recipe element data". The contents of each table data include the followings.

The term "base" includes food ingredients, materials (e.g. vegetable, meat, spice, etc.), and/or kitchen equipment for cooking those materials.

The term "part" includes pre-treated base (e.g. finely-chopped vegetable, pre-seasoning fish, pre-seasoning meat, etc.), and/or kitchen equipment for the pre-treating.

The term "product" includes processed part, assembled parts, and/or kitchen equipment for the processing/assembling. More specifically, the term "product" includes cooking subject or event for process such as boiling, broiling, grilling, steaming, frying, stir-frying, or the like. For example, "grilling Hamburger" or "griddle" can be included in the "product". In the embodiments, materials, which are to be utilized for the "product" without processing (e.g. spices), are included in the "part" as an illustration. Therefore, the information about spices etc. can be stored as the "base", and additionally, it can be stored as the "part".

The term "finished-dish" includes finished-cooking, dish or plate for cooking, devices, and/or arrangement process (e.g. dishing up, putting some sauce, accompanying some relish, etc.).

The cooking, which can be also used as sauce or relish for other menu, can be the "finished-dish" or the "product" in accordance with contents of recipe. More specifically, when "fried potato" is a finished-dish, the data for "fried potato" should be categorized as data for "finished-dish". On the other hand, when "Hamburger with fried potato" is a finished-dish, generally, the data for "fried potato" should be categorized as data for "product".

The configuration examples of the finished-dish table data 70, product table data 72, part table data 74, base table data 76, and base table data for kitchen equipment 78 included in the recipe database 22 will be given below together with the drawings. In the embodiments, "Hamburger with grated radish (or Hamburger stake with grated Daikon)" will be illustrated as "finished-dish".

Each data table primarily maintains foodstuff name of the data, storage area for storing finished-dish name etc. (which corresponds to the term "recipe element data storage area"), storage area for storing amount information of the foodstuff used, storage area for storing calorie information, storage area for storing link information to higher hierarchy table data (which corresponds to the term "link information storage area"), storage area for storing filtering information to specify cooking method or the like (which corresponds to term "recipe specifying information storage area").

2-2-1. Finished-Dish Table Data

FIG. 15 illustrates a configuration example of the finished-dish table data 70. The finished-dish table data 70 maintains the data for "Hamburger with grated radish". More specifically, the table data maintains an amount of used (gram for four persons), calorie (kcal for one person), nutritional value (for one person), and filtering information such as corporate information, local information, and cooking time. Also, the link information (i.e. contents link) is maintained by correlating with each filtering information and the link information is for linking to contents data maintaining cooking method and the like.

2-2-2. Product Table Data

FIG. 16 illustrates a configuration example of the product table data 72. The product table data maintains the data for "Hamburger (grilling)". More specifically, the table data maintains an amount of product used for a finished-dish (i.e. an amount of usage of product), calorie, nutritional value, filtering information, link information to higher hierarchy table data (i.e. table link information or link information to table data of finished-dish for which "Hamburger (grilling)" is used), and contents priority information. In FIG. 16, the link information corresponds to information stored in the finished-dish name column of the table link information such as "Hamburger with grated radish", "Hamburger cooked in tomato sauce (or Hamburger stake stewed in tomato sauce)", or "Hamburger with tomato sauce and fried potato". The contents priority (which corresponds to the term "process sequence information") is utilized for determining sequence of presenting contents or sequence of presenting cooking method when the system extracts plural of table data on the same hierarchy for one recipe.

2-2-3. Part Table Data

FIG. 17 illustrates a configuration example of the part table data 74. The part table data maintains the data for "Hamburger (kneading)" and items similar to above-mentioned table data. The table link information is for linking to finished-dish and product table data that belong to higher hierarchy than that of the part. In FIG. 17, the link information corresponds to information stored in the finished-dish name column of the table link information such as "Hamburger with grated radish", "Hamburger cooked in tomato sauce", or "Hamburger with tomato sauce and fried potato", and/or information stored in the product name column of the table link information such as "Hamburger (grilling)" or "Hamburger (stewing)". The link information can include only product name information that belongs to one higher hierarchy, or product name and finished-dish name information that belong to all higher hierarchy than that of the part.

2-2-4. Base Table Data

FIG. 18 illustrates a configuration example of the base table data 76. The base table data maintains the data for "ground pork" and items similar to above-mentioned table data. The table link information is utilized to link to the finished-dish, product, and part table data that are higher hierarchy than that of the base.

The nutritional value (or nutritive value) of each table data can includes the followings (not shown in figures).

Examples of nutritional value information: energy (kcal), protein (g), fat (g), carbohydrate (g), dietary fiber (g), potassium (mg), calcium (mg), magnesium (mg), iron (mg), equivalent amount of salt (g), equivalent amount of retinol (μg), vitamin D (μg), vitamin E (mg), vitamin B1 (mg), vitamin B2 (mg), vitamin C (mg), cholesterol (mg)

As an example of element information composing a recipe, the four hierarchies of table data including base, part, product, and finished-dish are disclosed. The idea of grouping contents of each hierarchy, the number of hierarchy, or the like can be modified by well-known techniques by those skilled in the art.

2-3. Contents Database

Each of the table data maintains link information (i.e. contents link) for linking to contents of cooking process, cooking method, or the like by correlating with the filtering information. The contents are stored in the contents database 23 (refer to FIG. 1).

FIG. 20 illustrates a configuration example of the contents database 23. FIG. 20A illustrates contents 80 that is being correlated with the contents link maintained on base table data 76 of "ground pork" (FIG. 18). The contents include a file name of movie file for representing movie of "ground pork" as moving picture information.

FIG. 20B illustrates contents 81 that is being correlated with the contents link maintained on part table data 74 of "Hamburger (kneading)" (FIG. 17). The contents include text information for representing cooking method for "Hamburger (kneading)" as part making process and a file name of movie file for representing cooking process movie of "Hamburger (kneading)" as moving picture information.

FIG. 20C illustrates contents 82 that is being correlated with the contents link maintained on product table data 72 of "Hamburger (grilling)" (FIG. 16). The contents include text information for representing cooking method for "Hamburger (grilling)" as product making process and a file name of movie file for representing cooking process movie of "Hamburger (grilling)" as moving picture information.

FIG. 20D illustrates contents 83 that is being correlated with the contents link maintained on finished-dish table data 70 of "Hamburger with grated radish" (FIG. 15). The contents include text information and freeze-frame picture information for representing plate dishing up for "Hamburger with grated radish" as finished-dish making process (i.e. assemble process) and a file name of movie file for representing the assemble process of "Hamburger with grated radish" as moving picture information.

FIG. 20E illustrates contents 84 that is being correlated with the contents link maintained on base table data of kitchen equipment (FIG. 19). The details of contents 84 will be disclosed in the second embodiment.

For creating the contents, standardized moving picture data such as Motion Picture Experts Group (MPEG) based data can be utilized. The method for creating the contents and corresponding method between the table data and contents, storing method for movie file, or the like are disclosed as examples and they can be modified by well-known techniques by those skilled in the art. For outputting the cooking process etc., different techniques such as movie data, movie data with sound data, sound data only (i.e. read foodstuff name and/or making process by computer), freeze-frame picture data, text data, or combination of them can be adopted.

Information included in the contents such as movie etc. can be created as one data file including making process of all subjects in the table data, or as several data file by dividing the making process. Representing the making process movie etc. can be executed by running pre-determined order, or by running user selected cooking process part only in accordance with user selection.

3. Embodiments

The "recipe providing device" correspond to the recipe service server 200 illustrated in FIG. 1. The "client device" corresponds to the client computer 100 illustrated in FIG. 1. The "recipe providing system" corresponds to the recipe providing service system illustrated in FIG. 1.

Figures 7A, 7B, 7C:
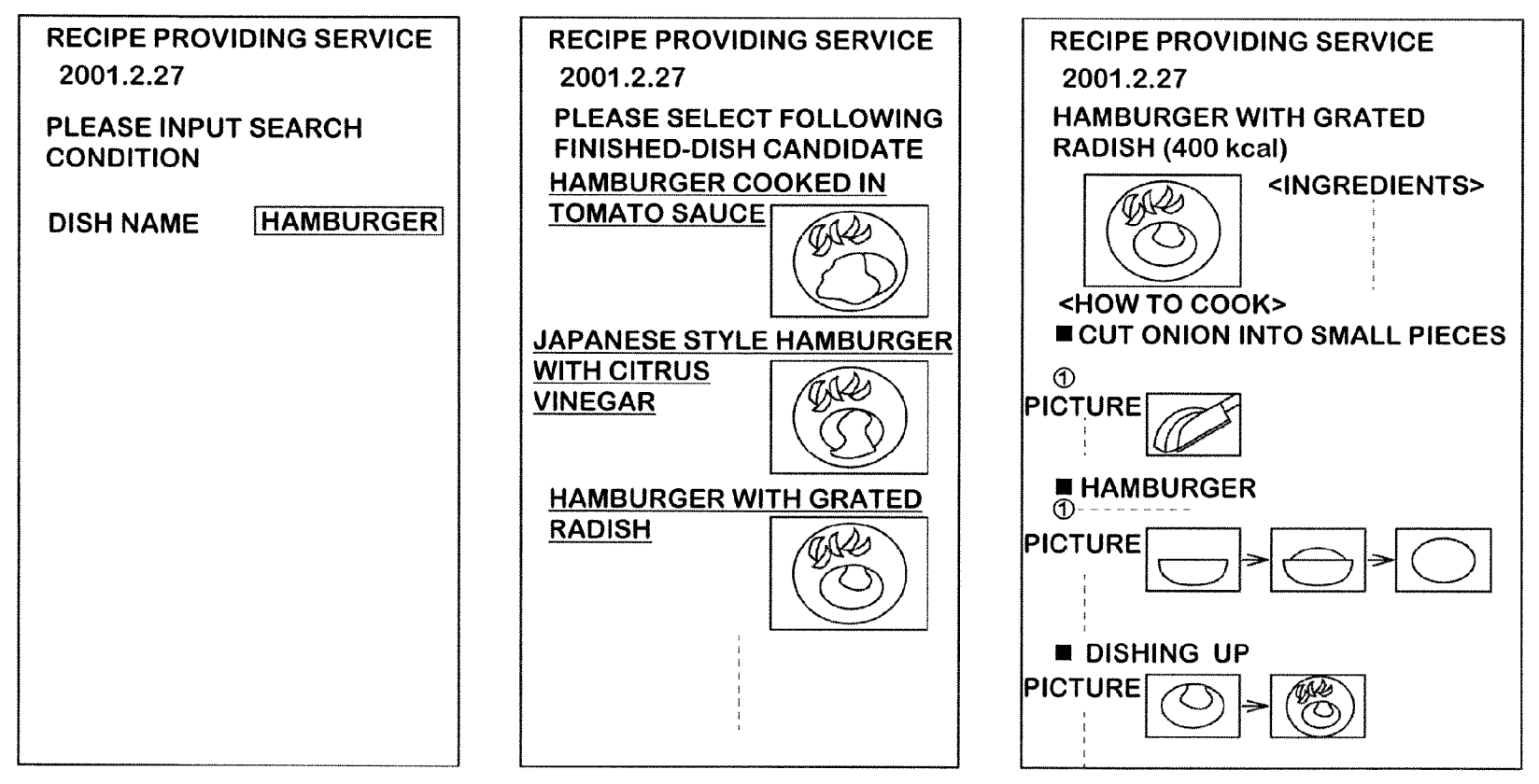

The "recipe" corresponds to the information displayed on the monitor illustrated in FIG. 7C or the like. The "recipe element data" corresponds to each table data illustrated from FIG. 15 to FIG. 19.

Figure 6:
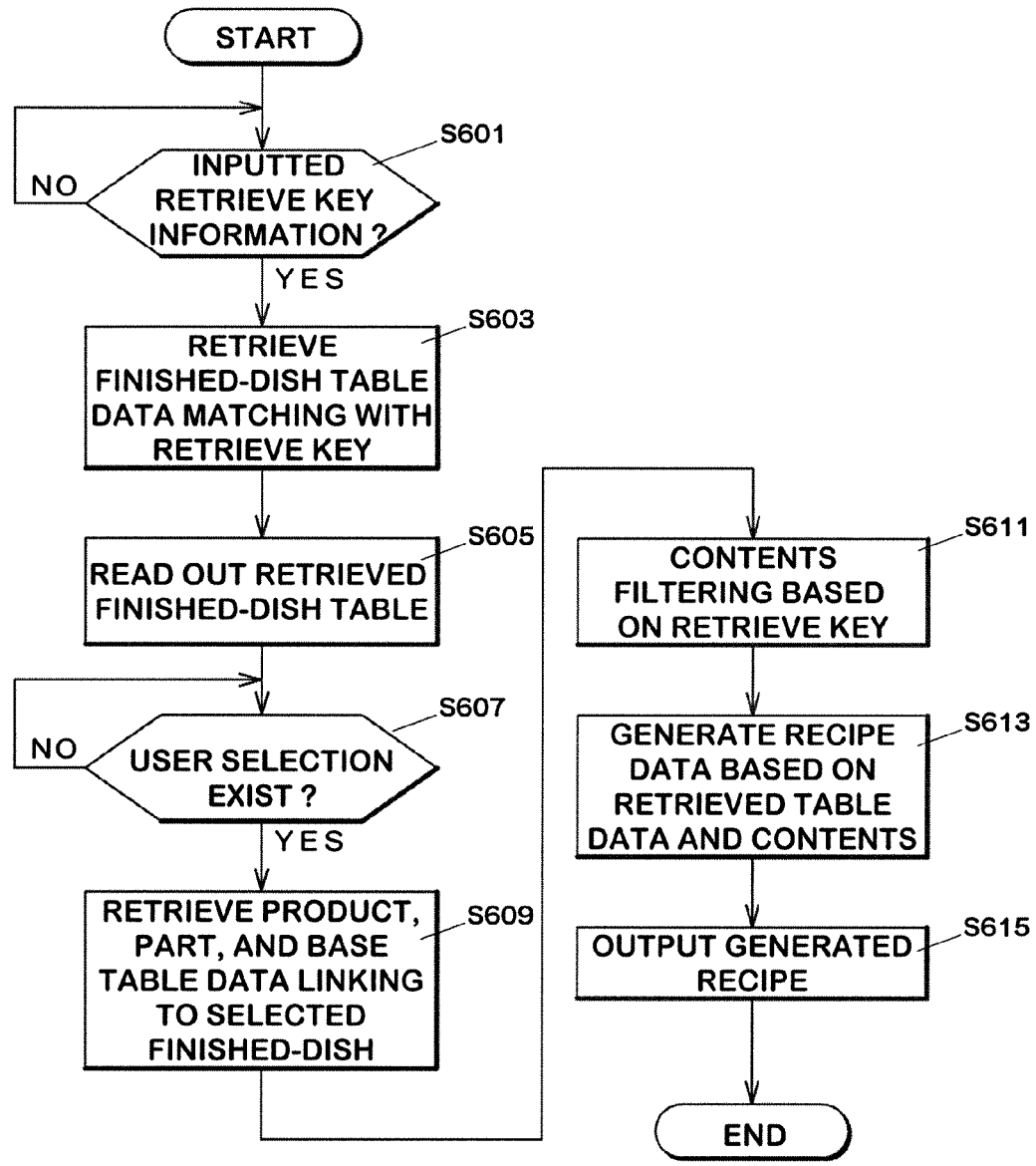
FIG. 6 illustrates a program flowchart for the recipe generating process portion according to a first embodiment.

The "recipe requirement" corresponds to the retrieve key information inputted at step 601 in FIG. 6, the user profile being stored in the client data 400 illustrated in FIG. 14, the vendor profile, the recipe profile inputted as retrieve key information in a first embodiment, specific profile illustrated at section "9-2", or the like.

The "recipe data requesting means" and "recipe data receiving means" correspond to the CPU 2 of client computer 100 executing the connecting process to the recipe service server 200 during the recipe generating process illustrated in FIG. 6.

The "recipe element data storing unit" corresponds to the hard disk 44 of recipe service server 200 illustrated in FIG. 4. The "recipe data generating means" corresponds to the CPU 40 of recipe service server 200 executing the process illustrated in the flowchart of FIG. 6. The "recipe data sending means" corresponds to the CPU 40 executing the process of step 615 in FIG. 6.

The "kitchen equipment" corresponds to the "food processor (or speed-cutter)" etc. illustrated in FIG. 19. The "material" corresponds to "ground pork" etc. illustrated in FIG. 18. The "intermediate material" corresponds to "Hamburger (kneading)", "Hamburger (grilling)", or the like illustrated in FIG. 17. The "finished-dish" corresponds to "Hamburger with grated radish" illustrated in FIG. 15.

For the product illustrated in FIG. 16, the "other higher hierarchy recipe element data" corresponds to the "finished-dish table data". For the part illustrated in FIG. 17, the "other higher hierarchy recipe element data" corresponds to the "finished-dish table data" or "product table data". For the base illustrated in FIG. 18 and FIG. 19, the "other higher hierarchy recipe element data" corresponds to "finished-dish table data", "product table data", or "part table data". Therefore, the "higher hierarchy" includes only one higher hierarchy, two or more higher hierarchy, or all of the higher hierarchy.

The "cooking process" corresponds to the information of "amount of used (gram for four persons)" illustrated from FIG. 15 to FIG. 19 or information of the contents illustrated in FIG. 20.

The "information indicating a local feature" corresponds to the local information stored in the finished-dish table data 70 etc. illustrated in FIG. 15.

The "information indicating a vendor" corresponds to the corporate information stored in the finished-dish table data 70 etc. illustrated in FIG. 15.

4. An overview of the Data Table Configuration

The data table configuration utilized from the first to third embodiment will be given below. Recipe data is composed by assembling the base table data, part table data, product table data, or finished-dish table data. One feature of the present invention is to store plural of data table that are from chronologically divided cooking process of one recipe, and to store an association information among those data table.

Figure 5:
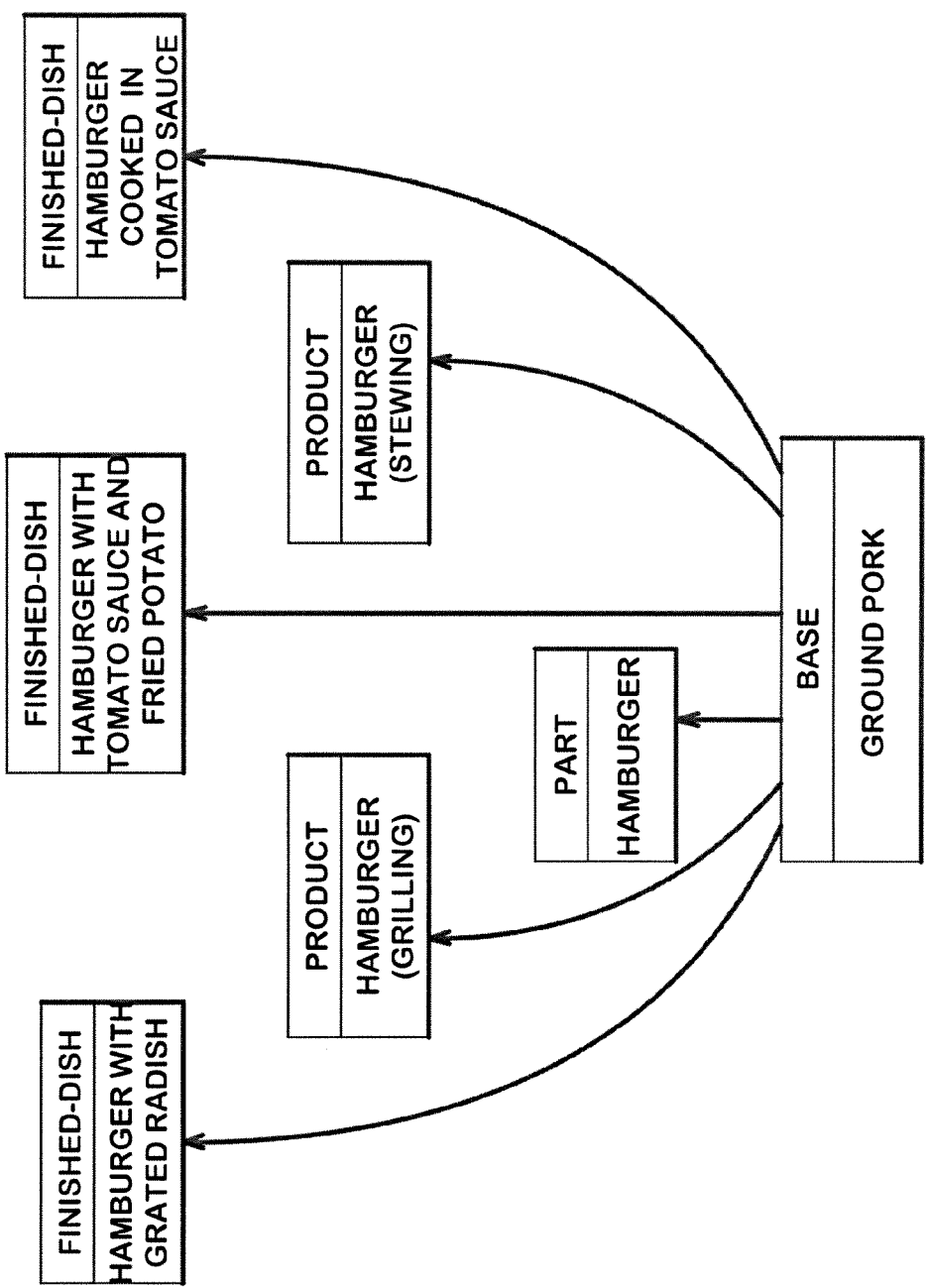
FIG. 5 illustrates an overview representing relationship among the table data utilized in a recipe generating process.

FIG. 5 illustrates an overview representing relationship among the table data utilized in the recipe generating process. Each table data illustrated in FIG. 5 is the finished-dish table data, product table data, part table data, and base table data, respectively. Each table data stores table link information (refer to the arrow mark in the figures) for linking to a higher hierarchy table data (which corresponds to table link information illustrated from FIG. 15 to FIG. 19). The instruction for linking to higher hierarchy enables the table data to direct the finished-dish for which the foodstuffs on the table is used (i.e. finished-dish-oriented).

More specifically, as illustrated in FIG. 5, the base table data of "ground pork" directs to "Hamburger with grated radish", "Hamburger with tomato sauce and fried potato", "Hamburger cooked in tomato sauce", or the like as they use the "ground pork". The part table data and product table data store the link information to higher hierarchy as well as the base table data (not shown).

When certain finished-dish is used as a reference, the configuration of table data enables the system to extract lower hierarchy table data (i.e. the product, part, and base) as they link to the finished-dish, and to finalize recipe data for the finished-dish. Also, when the number of high hierarchy information (i.e. the finished-dish etc.) is greater than that of low hierarchy information (i.e. the base etc.), it can be easy to maintain the table information with minimizing redundancy.

5. First Embodiment

As a first embodiment according to the present invention, the recipe generating process executed by the CPU 40 of recipe service server 200 will be given below. In the recipe generating process, the CPU 40 retrieves data from the recipe database 22 based on an inputted retrieve key information, and generate a recipe that is suitable for a user of client computer 100.

The first embodiment will be given below together with a program flowchart of recipe generating process illustrated in FIG. 6 and an example of a monitor display of the client computer during the recipe generating process illustrated in FIG. 7 according to the first embodiment. The following embodiment will be operated on the precondition that user has been already inputted the client data illustrated in FIG. 14 on the client database 24.

The CPU 40 of recipe service server 200 determines whether a retrieve key information was inputted from the client computer 100 (step 601 in FIG. 6). In the first embodiment, the retrieve key information includes recipe profile (i.e. property of recipe). More specifically, the recipe profile is used for specifying a recipe name. The system is capable of generating a recipe that belongs to a group of specific food name, or a recipe that utilizes certain foodstuff(s) based on the recipe profile. In modified embodiments, the recipe profile includes information about necessity of using foodstuffs, necessity of using pouch-packed foods, necessity of using canned products, necessity of using frozen food, necessity of using prepared food, foodstuffs expiration date information, or the like.

The CPU 40 stores the inputted retrieve key information in memory 42 (In the embodiments, hard disk 44 can be used instead of memory 42). For the purpose of illustrations, the following steps will be explained assuming that the retrieve key information of "Hamburger" was inputted. FIG. 7A illustrates an example of a monitor display of the client computer at step 601. As an example of the user interface for inputting the retrieve key information or selecting finished-dish in the embodiments, the graphical user interface (GUI) can be utilized.

If the retrieve key information was inputted at step 601, the CPU 40 retrieves a finished-dish table data containing the inputted retrieve key information from the recipe database 22 (step 603). More specifically, the CPU 40 retrieves the finished-dish table data containing "Hamburger" in at least a part of finished-dish name information of the finished-dish table data 70 illustrated in FIG. 15. In the example illustrated in FIG. 15, the CPU 40 stores table data information of "Hamburger with grated radish", "Japanese style Hamburger with citrus vinegar (or Hamburger stake with vinegar soy sauce (known as Ponzu)", and "Hamburger boiled with tomato sauce" in memory 42 (In the embodiments, indicative information for the table data can be used instead of the table data information.). The CPU 40 outputs the contents of retrieved finished-dish table data such as finished-dish name and freeze-frame picture information for a dishing up example (step 605). More specifically, the outputs include each finished-dish name of "Hamburger with grated radish", "Japanese style Hamburger with citrus vinegar", and "Hamburger boiled with tomato sauce" stored in each table data illustrated in FIG. 15 and freeze-frame picture information obtained by utilizing the contents link stored in each table data. In the example illustrated in FIG. 15, the outputting process for the freeze-frame picture information can be executed by referring the contents 83 that is specified with contents ID "D151 (i.e. main number of D15101)" illustrated in FIG. 20D based on the contents link of "D15101", and by reading the freeze-frame picture file of "D151001.jpg" that is specified with the contents 83. FIG. 7B illustrates an example of a monitor display of the client computer at step 605.

The CPU 40 determines whether select information for selecting the outputted finished-dish was inputted by the user of client computer 100 (step 607). For the purpose of illustrations, the following steps will be explained assuming that the user selected "Hamburger with grated radish" as a finished-dish. If select information was inputted, the CPU 40 retrieves product table data, part table data, and base table data that link to the selected finished-dish table (step 609) (Configurations of each table data are illustrated from FIG. 16 to FIG. 18). More specifically, the CPU 40 retrieves table data maintaining "Hamburger with grated radish" in the finished-dish name column of table link information from table data illustrated from FIG. 16 to FIG. 18, and stores the retrieved table data information in memory 42. For the purpose of illustrations, the following steps will be explained assuming that each table information of "Hamburger (grilling)" as product table data, "Hamburger (kneading)" and "minced onion" as part table data, and "ground pork" as base table data are stored in memory 42.

The CPU 40 executes contents filtering process based on the inputted retrieve key information (step 611). More specifically, the CPU 40 determines whether there is filtering information in the filtering information column illustrated from FIG. 15 to FIG. 18 that matching (or fuzzy matching) the inputted retrieve key information. If there is filtering information matching the retrieve key, the CPU 40 stores the contents link information containing the filtering information in memory 42. On the other hand, if there is no filtering information matching the retrieve key, the CPU stores the "default" contents link information in memory 42. For the purpose of illustrations, the following steps will be explained assuming that the "D15101" etc. as contents link information corresponding to the finished-dish table data illustrated in FIG. 15 are stored. Also, the "C27401" etc. for the product table data illustrated in FIG. 16, the "B10501" etc. for the part table data illustrated in FIG. 17, and the "A02501" etc. for the base table data illustrated in FIG. 18 are stored. A process example for selecting contents other than the default in the filtering process will be given below.

The CPU 40 generates a recipe web page based on each of the table data stored in memory 42 and its corresponding contents link information (step 613). For example, the CPU 40 completes a recipe web page (i.e. HTML file) by assembling the extracted contents based on the contents link information so that the contents are displayed from top to down in order: "base", "part", "product", and "finished-dish". Creating a recipe web page by assembling the table data can be executed by assembling information such as name of foodstuffs etc., amount of used, or calorie illustrated form FIG. 15 to FIG. 19, and/or each contents information illustrated in FIG. 20, and creating HTML.

Figure 22:
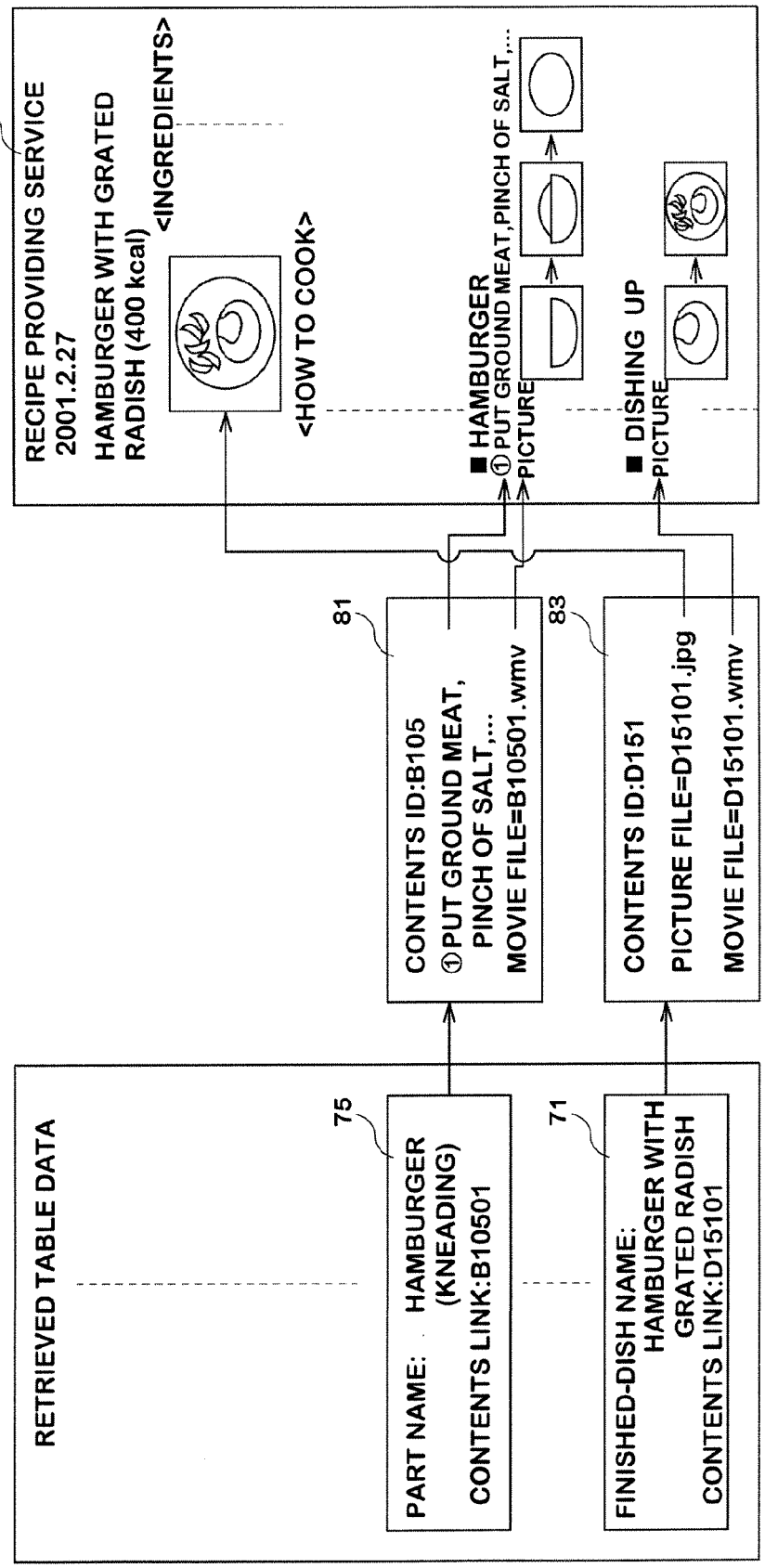
FIG. 22 illustrates a schematic diagram representing a recipe web page generating process.

The recipe web page generating process at step 613 will be given below together with a schematic diagram illustrated in FIG. 22. FIG. 22 illustrates a recipe web page generating process for a part of recipe. As illustrated in FIG. 22, table data information for "Hamburger (kneading)" and contents link information of "B10501" are stored in memory 42 as data 75 relating to part table. Also, table data information for "Hamburger with grated radish" and contents link information of "D15101" are stored in memory 42 as data 71 relating to finished-dish table.

The CPU 40 stores contents 81 in memory 42 by utilizing the number "B105" that is main number of "B10501" as contents link information maintained in data 75. Also, the CPU 40 stores contents 83 in memory 42 by utilizing the number "D151" that is main number of "D15101" as contents link information maintained in data 71. The CPU 40 generates a HTML data for including the finished-dish name text data of "Hamburger with grated radish", the freeze-frame picture file "D15101.jpg" of "Hamburger with grated radish", and the like for the top of web page 220 based on the contents 83 etc. of finished-dish. The CPU 40 then completes the recipe web page by arranging from top to down in order: certain contents of "base", "part", "product", and "finished-dish" in the web page 220 based on the contents link information of each table data and the like.

As illustrated in FIG. 22, the CPU 40 lists the part name text data of "Hamburger" etc. and the movie file "B10501.wmv" for displaying a cooking process of "Hamburger" into the HTML for the web page 220 based on the contents 81 etc. of part. The CPU 40 also lists the movie file "D15101.wmv" for displaying a plate arranging process into the HTML for bottom of web page 220 based on the contents 83 etc. As described above, the CPU 40 completes the HTML for displaying the recipe web page.

The CPU 40 outputs the generated recipe web page (i.e. a HTML file) to the client computer 100, and completes its task (step 615).

FIG. 7C illustrates an example of a monitor displays of the client computer at step 615. In the embodiments, playing the movie file included in a recipe web page is executed by Microsoft's Windows™ Media Player with a plug-in module. For example, playing of each movie file is started in accordance with user operation such as clicking a play button.

The above-mentioned is the processing of the first embodiment. In the first embodiment, one recipe web page is generated by assembling plural of databases and the databases are hierarchized as four steps in chronological cooking process order.

According to contents of a recipe, more detailed or complex hierarchy can be applicable instead of the four hierarchies structure. For example, "Hamburger (kneading)" as a part is illustrated in FIG. 17. The "Hamburger" includes other part such "minced onion" or "milk-soaked bread" as a pre-treated foodstuff. In this case, the part data of "Hamburger" includes other part data ("minced onion" or "milk-soaked bread").

As above-mentioned case, when plural of table data on the same hierarchy are extracted for a recipe data, it is preferable that sequence for assembling the plural of table data in a recipe should be pre-determined. If such sequence is not determined, for example, it is possible that the contents of "minced onion" is played after playing the contents of "Hamburger (kneading)". In this case, the user may guess wrong that the "minced onion" is needed besides the "Hamburger (kneading)".

In the embodiment, each table data includes the contents priority for determining sequence of assembling among the plural of table data on the same hierarchy for one recipe (refer from FIG. 16 to FIG. 19). The contents priority is utilized, when there are plural of table data on the same hierarchy and they have same table link information for common higher hierarchy table data, for enabling the CPU 40 to determine the number of assembling sequence for each extracted table among the plural of table data. Therefore, a HTML file is generated in order to display from top to down of the web page in order of contents for "base", "part", "product", and "finished-dish". Also, when there are plural of contents on same hierarchy, a HTML file is generated in order to display the plural of contents in accordance with the contents priority. More specifically, when the system extracts part table data having link target file of "Hamburger with grated radish" as finished-dish, "egg", "minced onion", "milk-soaked bread", "Hamburger (kneading)", and the link is selected. These selected part table data have link target file of "Hamburger (grilling)" as a higher hierarchy product table. Also, each of the selected part table data has a contents priority: "(1/4)", "(2/4)", "(3/4)", and "(4/4)" ((X/total number): where X indicates the number of assembling sequence), respectively by correlating with the information of "Hamburger (grilling)". These table data features enable the system to display from top to down of a recipe web page in accordance with a part presenting order (i.e. arrangement sequence of contents) to users, such as in order: "egg", "minced onion", milk-soaked bread", and "Hamburger (kneading)".

In modified embodiments for the contents priority setting, the following method can be adopted. For example, the "egg", "minced onion", "milk-soaked bread", and "Hamburger (kneading)" are on same hierarchy level and belong to same group (e.g. inclusive relation group). In this case, those table data have the contents priority as well as information indicating that they belong to same group. More specifically, the contents priority for the "minced onion" is recorded as "(2/4/2)" ((X/total number/group number): where X indicates the number of assembling sequence). That contents priority information (i.e. the group number) can distinguish one group (e.g. inclusive relation group) from another group when there are more than one group on same hierarchy.

In the embodiment, presenting the contents based on the contents priority is executed by arranging from top to down, or left to right within a recipe web page in accordance with the priority for a commonly-used web page as illustrated in FIG. 7C. In modified embodiments, the contents of each hierarchy is included in a separate web page and all the web page composing a recipe are arranged in order of the contents priority.

In the above-mentioned embodiments, in order to extract table data based on a finished-dish, a finished-dish table is recorded as a link target. In a certain cooking situation, a recipe for more segmented element-based can be required instead of a recipe for finished-dish. More specifically, some user may need only a recipe for "Hamburger (grilling)" as the product or "Hamburger" as the part instead of a recipe for the finished-dish. In the embodiments, table data includes link information for not only a corresponding finished-dish but also all of corresponding higher hierarchy.

More specifically, as illustrated in FIG. 5, base table data of "ground pork" includes link information for part of "Hamburger" using the "ground pork", and link information for product of "Hamburger (grilling)" and "Hamburger (stewing)" using the "ground pork".

The above-mentioned table data structure illustrated in FIG. 5, the system is capable of extracting not only a finished-dish but also product-base or part-based recipe (i.e. a part of recipe).

An overview of the process for generating a recipe for the "part" will be given based on the program flowchart of recipe generating process illustrated in FIG. 6. At step 601 in FIG. 6, the user of client computer 100 inputs "part" name such as "Hamburger" (i.e. intermediate material, processed material) as a retrieve key information. The CPU 40 of recipe service server 200 retrieves part table data, base table data, or the like that link to the part table of "Hamburger" (corresponds to step 609 in FIG. 6), then, generates a recipe for the "part" of "Hamburger" by executing step 611, 613, and 615. That process can be applicable to generating a recipe for "product" hierarchy.

6. Second embodiment (Handling "Base" Table Data for Kitchen Equipment as an Embodiment)

As a second embodiment according to the present invention, the recipe generating process executed by the CPU 40 of recipe service server 200 will be given below. One of the differences between the first and the second embodiment is that, in the second embodiment, the system includes "base" table data of the kitchen equipment. The system is capable of presenting a suitable cooking method that utilized the user's kitchen equipment by presenting variety of kitchen equipment.

A configuration example of the base table for kitchen equipment will be given below. Then, the second embodiment will be given by focusing on the point of differences with the first embodiment.

6-1. Base Table Data (for Kitchen Equipment)

FIG. 19 illustrates a configuration example of the base table data 78 maintaining kitchen equipment data. As similar to the base table for foodstuffs etc., the base table 78 maintains table data for kitchen knife, filtering information, link information for linking to higher hierarchy table data (i.e. table link information: link information to finished-dish utilizing "base (i.e. foodstuffs)" for which the "kitchen knife" is used), and contents priority.

In the embodiment, the kitchen equipment for foodstuffs is illustrated as a member of "base" table. In modified embodiments, when certain kitchen equipment is used for "part" (i.e. pre-treated foodstuffs), information for the kitchen equipment can be maintained as "part" table. Also, when certain kitchen equipment is used for "product" (e.g. a griddle), information for the kitchen equipment can be maintained as "product" table.

6-2. Recipe Generating Process According to the Second Embodiment

As the second embodiment according to the present invention, the recipe generating process executed by the CPU 40 of recipe service server 200 will be given below. In the recipe generating process, when there are several kitchen equipment candidates for handling a certain foodstuff, the system enables the user to select a suitable kitchen equipment by presenting those kitchen equipment to the user.

Overview of the recipe generating process in the second embodiment will be given below together with FIG. 8, then, details of the second embodiment will be given.

6-2-1. Overview of second embodiment

Figure 8:
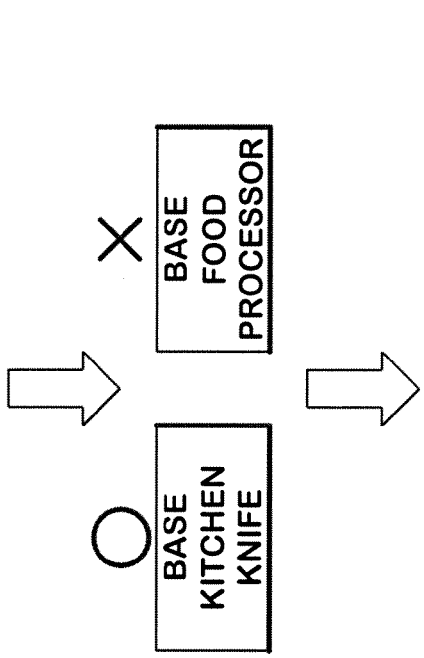
FIG. 8 illustrates an overview representing the recipe generating process according to a second embodiment.

FIG. 8 illustrates an overview representing the recipe generating process according to the second embodiment. The CPU 40 of recipe service server 200 retrieves each of "finished-dish", "product", "part", and "base" table data by executing a similar process of the first embodiment. The CPU outputs "base" table data candidates (i.e. foodstuffs and kitchen equipment) to a user of client computer 100 (FIG. 8, step 1). As illustrated in FIG. 8, the CPU outputs "onion" as a "base (i.e. foodstuff)", as well as "kitchen knife" and "food processor" as "base (i.e. kitchen equipment)" candidates for handling the "onion". The user selects a "base" of user's choice from those several "base (i.e. kitchen equipment)" (step 2). In the figure, the user selects the "kitchen knife". The CPU 40 generated a recipe data based on the selected "base (i.e. foodstuffs and kitchen equipment)" (step 3). Since the user selects the "kitchen knife", the system presents the generated recipe with the cooking process of "cut onion by knife" as illustrated in FIG. 8.

6-2-2. Process of the Second Embodiment

The second embodiment will be given below together with a program flowchart of recipe generating process illustrated in FIG. 9 and an example of a monitor display of the client computer 100 during the recipe generating process illustrated in FIG. 10. The difference between the first embodiment and the second embodiment is that, in the second embodiment, the system provides "kitchen equipment" as a "base". For the sake of simplicity, the second embodiment will be given by focusing on the point of differences with the first embodiment.

The CPU 40 of recipe service server 200 starts the recipe generating process and extracts "product" table data, "part" table data, and "base" table data that link to the selected finished-dish table (refer to step 601, 603, 605, 607, and 609 in FIG. 6).

The CPU 40 determines whether there are more than one extracted "base" table (i.e. kitchen equipment) as base table candidates (step 901 in FIG. 9). For example, FIG. 8 represents the situation that there are more than one extracted base table candidates. More specifically, "kitchen knife" and "food processor" are candidates for handling "onion" in FIG. 8.

In order to enable the CPU 40 to determine whether there are "base" candidates, in the embodiment, all of base table data that should belong to same candidate maintain an identical contents priority. More specifically, the base table data of "food processor" maintains contents priority of "(3/7)" (contents priority X/total number), while the base table data of "kitchen knife" that can be alternative kitchen equipment of the "food processor" maintains contents priority of "(3/7)". As just described, when there are more than one table data maintaining a identical contents priority as, the CPU 40 determines there are more than one "base" table (i.e. kitchen equipment) as base table candidates.

If there are not more than one base table (for kitchen equipment) candidates at step 901, the CPU 40 executes the process from step 611. In this case, step for user's selection of kitchen equipment does not occur.

Figure 10A:
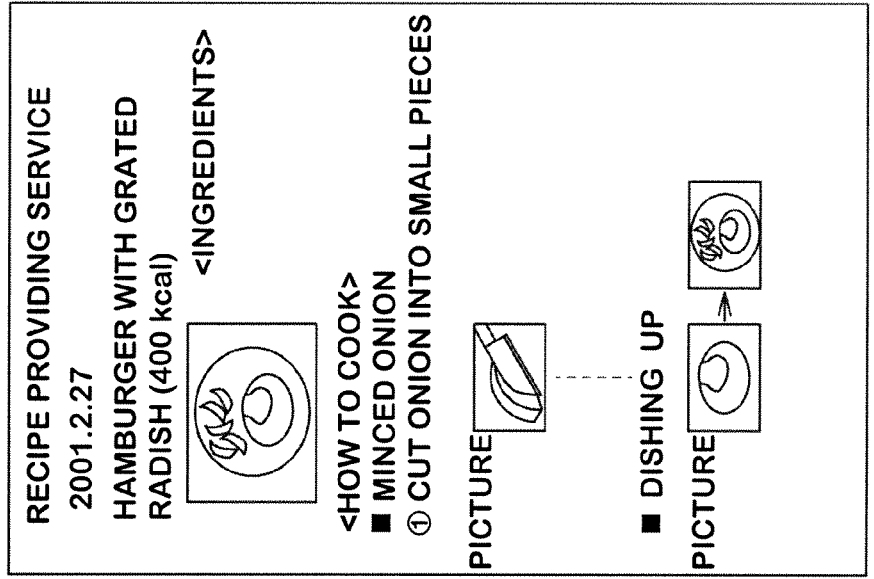
FIGS. 10A and 10B illustrate an example of a monitor display of the client computer during the recipe generating process according to the second embodiment.

If there are more than one base table (for kitchen equipment) candidates at step 901, the CPU 40 outputs those base table candidates to the client computer 100 (step 903). More specifically, the CPU 40 outputs the movie information etc. stored in the contents 84 illustrated in FIG. 20E. FIG. 10A illustrates an example of a monitor display of the client computer after processing of step 903.

The CPU 40 determines whether a user's selection for "base (kitchen equipment)" was inputted (step 905). When a user's selection was inputted, all table data for composing a recipe are determined. The CPU 40 executes process from step 611 in FIG. 6 based on the selected table data. The CPU 40 executes process of step 611 and 613 in FIG. 6, outputs the generated recipe web page to the client computer 100, and completes its tasks (step 615 in FIG. 6).

Figure 10B:
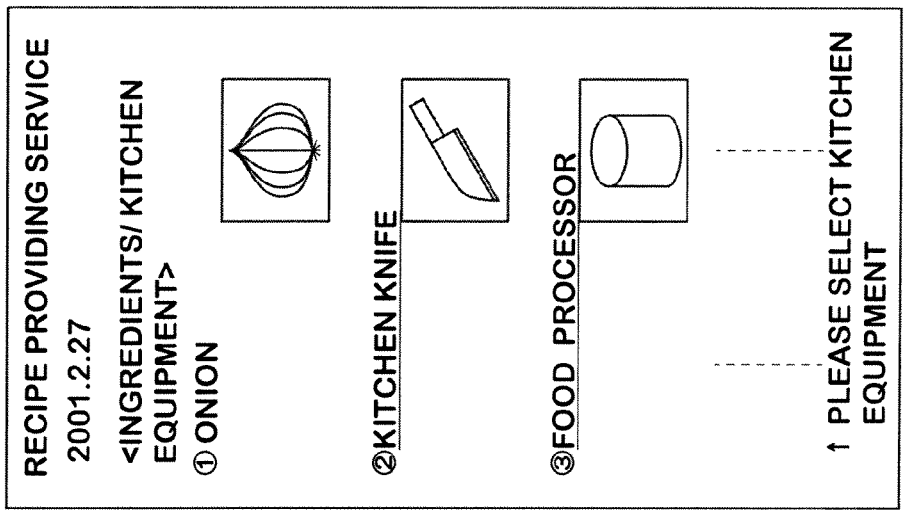

FIG. 10B illustrates an example of a monitor display of the client computer 100 at step 615 in FIG. 6 according to the second embodiment. In FIG. 10B, the recipe with the "kitchen knife" as the base (kitchen equipment) is presented.

7. Third Embodiment (Executing Substituting Process as an Embodiment)

As a third embodiment according to the present invention, the recipe generating process executed by the CPU 40 of recipe service server 200 will be given below. One of the differences between the first and third embodiment is that, in the third embodiment, the system substitutes table data for another one during the process. More specifically, when table of "salt" is selected as a foodstuff in a recipe, the system substitutes the table of "salt" for table of "lemon juice" for users who need to restrict intake of "salt". Therefore, the system is capable of providing a recipe whose taste is similar to that of a recipe without the substitution while restricting the salt.

A configuration example of substitution data by the CPU 40 of recipe service server 200 to execute substituting process will be given below. Then, details of the third embodiment will be given.

7-1. Substitution Data

FIG. 21 illustrates a configuration example of the substitution data 90. Substitution data is stored in hard disk 44 of recipe service server 200. The substitution data 90 includes a memory area (which corresponds to the term "a substitution rule information storage area") for storing retrieve key information as substitution information for each hierarchy of "product" "part", and "base". The substitution data 90 also includes a memory area (which corresponds to the term "a recipe element substitution information storage area") for information indicating both substitution subject data (i.e. data to be substituted, or pre-substitution data) and substitution target data (i.e. data for substituting, or after-substitution data). More specifically, when applying "hierarchy: part, retrieve key information: restriction/low salt, substitution subject data: salt, substitution target data: lemon juice" as illustrated in FIG. 21, the CPU 40 substitutes extracted part table of "salt" for part table of "lemon juice" upon receiving a retrieve key information of "low salt" as a food restriction from a user.

When substituting the part of "salt" for "lemon juice", the system also executes a substitution processing for "base" table as a lower hierarchy in the embodiments. More specifically, when substituting the part of "salt" for "lemon juice", the system substitutes the "salt" as a base of the "salt" part for "lemon" as a base of the "lemon juice" part. Without this substitution, the consistency between the base and the part may not be maintained after the substituting process. Therefore, in the embodiments, when substitution data for "product" or "part" table includes substitution data, the corresponding lower hierarchy table (i.e. "part" or "base") also includes substitution data.

7-2. Recipe Generating Process According to Third Embodiment

As the third embodiment according to the present invention, the recipe generating process executed by the CPU 40 of recipe service server 200 will be given below. The embodiment will be given by illustrating the situation as follows: The system provides a recipe data including "lemon juice" instead of "salt" upon receiving a retrieve key information of "low salt" as a food restriction from a user.

Overview of the recipe generating process in the third embodiment will be given below together with FIG. 11, then, details of the third embodiment will be given.

7-2-1. Overview of Third Embodiment

FIG. 11 illustrates an overview representing the recipe generating process according to the third embodiment. A user of the client computer 100 inputs "restrictions: low salt" as one of retrieve key information (FIG. 11, step 1). The CPU 40 of recipe service server 200 retrieves each of "finished-dish", "product", "part", and "base" table data by executing a similar process of the first embodiment. The extracted part table includes "salt" table (step 2). The CPU 40 substitutes the "salt" part table data for "lemon juice" part table data based on the substitution data (step 3).

7-2-2. Process of Third Embodiment

The third embodiment will be given below together with a program flowchart of recipe generating process illustrated in FIG. 12 and an example of a monitor display of the client computer 100 during the recipe generating process illustrated in FIG. 13. The difference between the first embodiment and the third embodiment is that, in the third embodiment, the system executes the substitution process. For the sake of simplicity, the third embodiment will be given by focusing on the point of differences with the first embodiment.

The CPU 40 of recipe service server 200 starts the recipe generating process and extracts "product" table data, "part" table data, and "base" table data that link to the selected finished-dish table (refer to step 601, 603, 605, 607, and 609 in FIG. 6).

Figure 12:
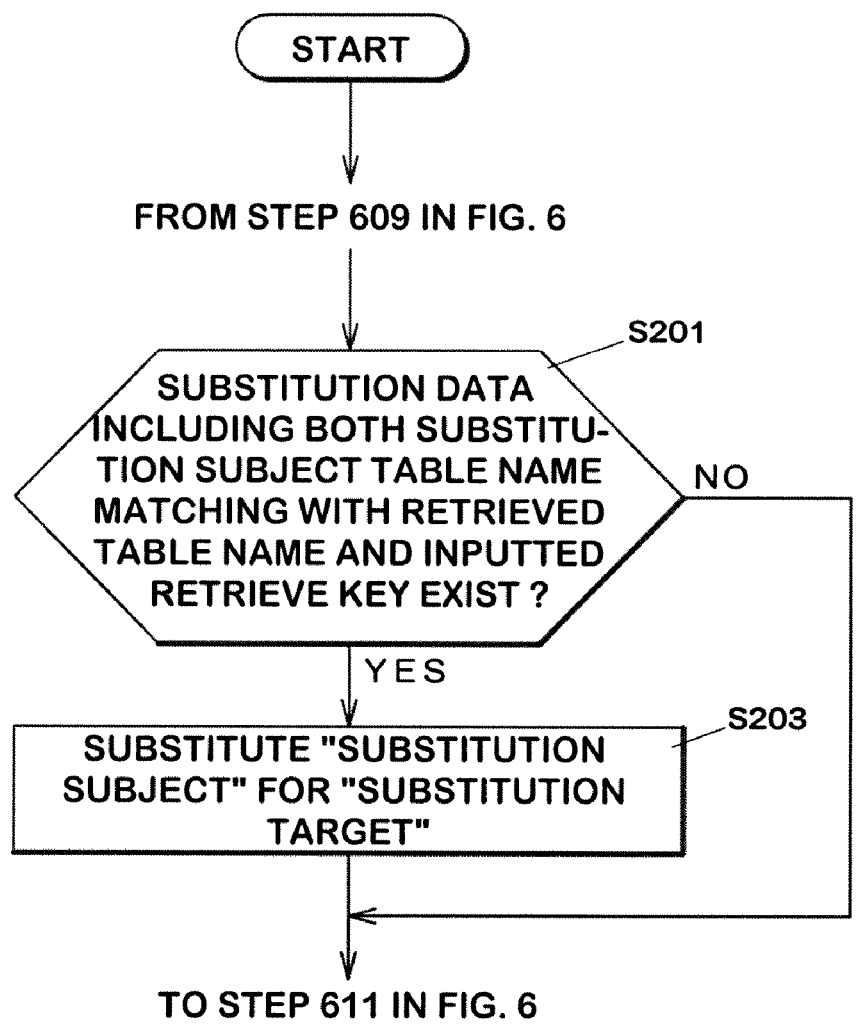
FIG. 12 illustrates a program flowchart for the recipe generating process portion according to the third embodiment.

The CPU 40 determines whether substitution data including both the extracted table data name at step 609 in FIG. 6 and the retrieve key information inputted by the user at step 601 in FIG. 6 was stored (step 201 in FIG. 12). The situation that there is substitution data including both the extracted table data name and the inputted retrieve key information is as follows. For example, when the inputted retrieve key information was "restrictions: low salt" and the extracted table data at step 609 include part table of "salt", the data 90 illustrated in FIG. 21 corresponds to the substitution data at step 201. More specifically, the CPU 40 searches the substitution data 90 illustrated in FIG. 21 for its data column including both the retrieve key information of "low salt" and one of the table data name extracted at step 609 in FIG. 6. The inputting the retrieve key information of "restrictions" can be executed, for example, by creating the monitor display illustrated in FIG. 7A so as to including item of "restrictions".

At step 201, if substitution data was stored, the CPU 40 substitutes the substitution subject table data for the substitution target table data in accordance with the substitution data 90 (step 203). More specifically, the CPU 40 replaces the part table data of "salt" extracted at step 609 in FIG. 6 with the part table data of "lemon juice".

After step 203, the CPU 40 executes the process from step 611 based on the substituted table data. The CPU 40 executes the process of step 611 and 613 in FIG. 6, outputs the generated recipe web page to the client computer 100, and completes its tasks (step 615 in FIG. 6).

Figure 13:
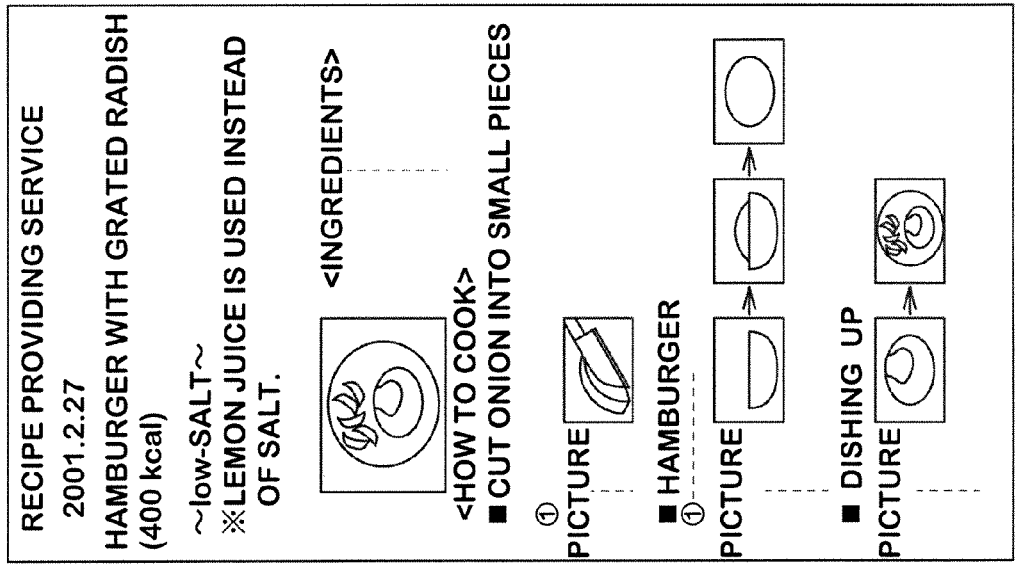
FIG. 13 illustrates an example of a monitor display of the client computer during the recipe generating process according to the third embodiment.

FIG. 13 illustrates an example of a monitor display of the client computer 100 at step 615 of FIG. 6 in the recipe generating process according to the third embodiment. FIG. 13 illustrates the recipe in which the extracted part table data of "salt" is substituted for the table data of "lemon juice" for the case in which the user inputs the retrieve key information of "restrictions: low salt".

The embodiments according to the present invention are described as above-mentioned from the first to third embodiment. The retrieve key information entry for the recipe service server 200, the user interface during the recipe generating process, storing the table link information, the recipe generating process algorithm (i.e. computer program), the filtering process algorithm (i.e. computer program), the substituting process algorithm (i.e. computer program), the recipe output including the contents output for presenting the cooking process, or the like in the embodiments are described as illustrations and they can be modified by well-known techniques by those skilled in the art.

For example, as the table link information utilized in the recipe generating process algorithm, the table name is used in the embodiments. In modified embodiments, the table link information can be stored as a pointer (i.e. address information) for addressing a memory unit of corresponding table data.

8. Advantages of the Embodiments

From the first to third embodiment, one recipe is divided into table hierarchies such as the base table, part table, product table, and finished-dish table (i.e. a cooking process is segmented from lower hierarchy to higher hierarchy.). Each of the hierarchy table data is set up so as to link to corresponding finished-dish. Therefore, the table data are categorized into certain groups on the basis of the finished-dish. Table data belonging to same group are defined so as to compose certain finished-dish (refer from FIG. 15 to FIG. 19).

On the contrary, the conventional recipe database is set up so as to include whole cooking process from beginning to end as one data unit. The database construction in the embodiments is a result of unique findings of the inventors of the present invention that includes the following recipe characteristics.

(1) Variety of finished-dish (i.e. variation of finished-dish) can be expanded by changing combination of materials, ingredients, foodstuffs, or processed/assembled of them. For example, a Hamburger includes combination of materials such as "ground pork", "minced onion", and the like. If "ground pork" is replaced with "tofu" within those materials, a recipe for "tofu Hamburger" can be obtained as healthy finished-dish. Therefore, by creating material-basis recipe data corresponds to a material etc. included in a recipe, the resultant database can be suitable for effectively utilizing the recipe characteristics where variety of finished-dish can be obtained by changing the combination of materials.

(2) Materials, ingredients, foodstuffs, or processed/assembled of them are commonly used for wide variety of finished-dish. For example, "ground pork" as a foodstuff can be used for Hamburger dish category such as "Hamburger with grated radish" and "boiled Hamburger", as well as other dish category such as dumpling. Therefore, by creating foodstuff-basis recipe data for a versatile material, a foodstuff, or the like and assigning the versatility to the recipe data with the link information (i.e. assigning a material itself with an address for directing the material toward a finished-dish in which the material is used), the resultant database can be suitable for effectively utilizing the recipe characteristics where many finished-dish can be obtained by using common foodstuffs.

(3) The users may require not only recipes for finished-dish but also recipes for certain material, or processed material as a unit. For example, besides "Hamburger" as a finished-dish, there may be users needs for "Hamburger" as an intermediated processed material (or intermediate processed ingredients, or half-way cooked ingredients) for a prepared food or a stored food (i.e. a cooking part at intermediate process, or a recipe for cooking subunit). Therefore, as above-mentioned in (2), by creating foodstuff-basis recipe data for a versatile material or a foodstuff, and assigning the material with link information to an intermediate processed ingredients in which the material is used (i.e. assigning a material itself with an address for directing the material toward an intermediated processed material in which the material is used), the resultant database can be suitable for effectively utilizing the recipe characteristics where a recipe for an intermediate process may be required.

In summary, one of the features of the embodiments is to construct the unique database utilizing the recipe characteristics.

From the first to third embodiment, the contents data representing cooking method, foodstuffs, and the like is retrieved or specified based on the retrieve key information (refer to the filtering process illustrated at step 611 in FIG. 6). Therefore, the system is capable of providing a highly-customized recipe that meets user's request. For example, More specifically, the system is capable of providing cooking method contents that meets user's request for shortened cooking time by filtering contents based on user's inputted retrieve key information. Also, if the system is set up so as to select contents of food goods from specific business corporation, the system can be adopted for the foodstuff business industry or the packed food business. The details of those filtering process will be given.

In the second embodiment, since the database includes information of kitchen equipment (or kitchen utensils, or cooking tools), the system is capable of providing a highly-customized recipe in consideration of user's kitchen equipment. More specifically, for users who select a "kitchen knife" to make "minced onion", the system is capable of providing a recipe with a movie etc. that represents minced onion with the kitchen knife. On the other hand, for users who select a "food processor", the system is capable of providing a recipe with a movie etc. that represents minced onion with the food processor.

In order to provide a kitchen equipment producer with recipe data or to advertise specific kitchen equipment, the system is capable of providing contents of those kitchen equipment on a priority basis.

In the third embodiment, the system is capable of substituting table data for other table data based on inputted retrieve key information such as allergenic food (or Ingredients may cause allergic reaction), reasonable amounts of intake energy (or optimum calorie intake), restrictions of food ingredients. Therefore, the system is capable of providing menus that meet user's physical condition. More specifically, for a user who selects retrieve key information of "low salt" as the restrictions, the system executes the table data substituting process so that a recipe element of "salt" to be substituted for "lemon juice". Therefore, the system is capable of providing a recipe whose taste is similar to that of a pre-substituted recipe and in consideration of user's health condition. Moreover, by customizing the substitution data, the system can be applicable to business for delicious hospital diet.

9. Other Embodiments 9-1. Other Embodiments of Recipe Generating Process

In the embodiments, the CPU 40 of recipe service server 200 generates finished-dish recipe data based on user's specified finished-dish name. In other embodiments, a finished-dish name input does not need to be an essential input item. In this case, the system obtains a user input for an item on the "product" hierarchy or lower, and generates a recipe data for the item on the inputted hierarchy. More specifically, when obtaining user input for "Hamburger", the CPU 40 generates a recipe data for the "Hamburger". In this embodiments, for example, the system can be applicable for the packed-food business. Also, for a personal use, the system can be applicable to a recipe for prepared or stored food.

Since each of the table data maintains the link information not only to finished-dish but also to higher hierarchy table in which a material of the table data is used (refer from FIG. 16 to FIG. 19), the system is capable of generating an intermediate processed ingredients (a recipe part).

In the embodiments, each of the table data maintains table link information to link all of the higher hierarchy table data. In other embodiments, the table link information maintained in each of the table data can be limited to certain hierarchy table data to meet a certain recipe providing purpose. For example, for only finished-dish recipe providing purpose, it is acceptable for each of the table data to maintain link information to link to finished-dish table data.

9-2. Other Embodiments of Filtering Process and Substituting Process

From the first to third embodiment, "food name" as retrieve key information inputted by a user is an essential input item. In other embodiments, the system can determine a recipe data based on retrieve key information other than the "food name". For example, based on a vendor profile as retrieve key information (which corresponds to the term "vendor information"), the system is capable of retrieving and extracting a recipe (or contents) including a foodstuff product from the vendor (i.e. business enterprise, food manufacturer, or the like).

More specifically, the CPU 40 obtains "vendor profile" as retrieve key information based on a user input. The CPU 40 determines whether there is information in the "corporation information" column as the filtering information illustrated from FIG. 15 to FIG. 19 that matching (or fuzzy matching) the inputted retrieve key information, and generates a recipe data.

For example, for the part table illustrated in FIG. 17, when receiving retrieve key information of "food corporation Y" (or its equivalent information), the CPU 40 executes playing the movie file of "B10502.wmv" instead of the default movie file of "B10501.wmv" for presenting contents of "Hamburger (kneading)" in the recipe web page.

In other embodiments, based on a specific profile as retrieve key information (which corresponds to the term "local information"), the system is capable of retrieving and extracting a recipe (or contents) of a specific country or local food, or a recipe (or contents) including a foodstuff from a specific area or local foodstuff from a business corporation (or food manufacturer).

More specifically, the CPU 40 obtains "local information" as retrieve key information based on a user input at step 601 in FIG. 6. The CPU 40 determines whether there is information in the "local information" column illustrated from FIG. 15 to FIG. 19 that matching (or fuzzy matching) the inputted retrieve key information, and generates a recipe data.

For example, for the base table illustrated in FIG. 18, when receiving retrieve key information of "origin (i.e. area of production) Z" (or its equivalent information), the CPU 40 executes playing the movie file of "A02503.wmv" instead of the default movie of "A02501.wmv" for presenting contents of the "ground pork" in the recipe web page.

In other embodiments, the system is capable of generating a recipe data for a certain region (country, district, area of production, or the like) or a recipe data for relating to a certain region. The term "local" in the present invention includes concept of places that can be associated with a recipe. For example, the term "local" includes information of country, city, region, area of production, land of origin, place of production, or the like.

As other information of the specific profile, information such as seasonal information for providing a suitable recipe, media dependence information indicating a recipe providing method (e.g. the broadband or the satellite broadcasting), event information (e.g. the seasonal festival, the New Year's holidays), or kitchen information (e.g. gas-utility or electric-utility) can be utilized.

As other embodiments, the system can be set up so as to select contents for representing a cooking method that meets user's request on cooking time length. More specifically, the CPU 40 obtains "cooking time" as retrieve key information based on a user input at step 601 in FIG. 6. The CPU 40 determines whether there is information in the "cooking time" column as the filtering information illustrated from FIG. 15 to FIG. 19 that matching (or fuzzy matching) the inputted retrieve key information, and generates a recipe data.

For example, for the product table illustrated in FIG. 16, when receiving retrieve key information of "quick" (or its equivalent information), the CPU 40 executes playing the movie file of "C27402.wmv" instead of the default movie file of "C27401.wmv" for presenting contents of "Hamburger (grilling)" in the recipe web page.

In other embodiments, the system can generates a recipe data based on certain information other than the user inputted retrieve key information. For example, the CPU 40 of recipe service server 200 is set up so as to utilize information relating to seasons and automatically retrieve a seasonal food that meets the seasonal information. More specifically, seasonal information (which corresponds to the term "information indicating a seasonality") is maintained in each of table data (refer from FIG. 15 to FIG. 19). When receiving a user's recipe request, the CPU 40 obtains calendar information (or event information) at the requesting time by utilizing a real time clock chip (RTC). Then, the CPU 40 retrieves table data relating to a seasonal food by comparing both the seasonal information in the table data and the obtained calendar information. The CPU 40 can be set up so as to retrieve table data relating to a seasonal food based on user's inputted seasonal information without utilizing the RTC.

The term "season" includes idea of time that may be acknowledged together with certain recipe. For example, the term "season" includes idea of four seasons, or seasonal event such as the New Year's holiday, Christmas, a seasonal festival, a cherry viewing picnic, or an athletic festival.

9-3. System Configuration Variations

In the embodiments, the recipe service server 200 and the client computer 100 are connected through the Internet 300, but the system configuration is not limited the embodiments. As modified device of the client computer 100, mobile devices such as a mobile phone or a personal handy-phone system, an Internet connectable car navigation system, a personal computer, a personal digital assistant (PDA), or the like can be used (not shown). The system in the embodiments can be operated by incorporating the client computer 100 (or its modifications) into a microwave oven (or a microwave range), an oven, a refrigerator, or the like (which correspond to the term "a home electric appliance (or home appliance)") (not shown). In this case, recipe data can be inputted in those home electric appliance by utilizing a memory card. In addition, when those home electric appliance are set up so as to access the Internet (i.e. "Internet connected home appliance"), users can enjoy the recipe providing service through the Internet. When a home electric appliance as the "recipe providing device" including similar function of the CPU 40 of recipe service server 200, users can enjoy the recipe providing service without connecting the Internet (i.e. the home electric appliance should have the "recipe data outputting means"). In this case, the database illustrated from FIG. 14 to FIG. 21 can be stored in the external memory device 7 of client computer 100.

In the embodiments, the recipe service server 200 and the client computer 100 are connected through the Internet 300. Besides the Internet, that connection can be executable by utilizing the broadcasting implementation such as broadcasting satellite digital (i.e. BS digital), communications satellite broadcasting digital (i.e. CS digital), ground-based broadcasting, community antenna television (i.e. CATV), or two-way TV (i.e. interactive TV).

9-4. Program Execution

In the embodiments, the computer program for the CPU 40 of recipe service server 200 is stored in the hard disk 44. The computer program can be installed in the hard disk etc. from an installation CD-ROM (not shown). In other embodiments, the program can be installed from computer-readable storage media such a flexible disk (FD) or IC card (not shown). Alternatively, the program can be downloaded to the devices via the communications lines. The program can also be installed on the devices from the CD-ROM, and the device executes the installed program. In other embodiments, the device can directly execute the program stored in the CD-ROM.

Computer-executable programs used in the embodiments include a program to be executable just after installation, a program that needs to be converted to another format (e.g. decompressing compressed data), or a program to be executable with other module.

In the embodiments, the functions of the recipe providing device and the client device are accomplished with both CPU and computer program. In other embodiments, all or a part of the functions can be accomplished with hardware logic (e.g. logic circuit) (not shown). The hardware configuration or CPU configuration can be modified by well-known techniques by those skilled in the art.

Data on the recipe database 22, contents database 23, and substitution data 90 are read from computer-readable storage media such a CD-ROM, a flexible disk (FD), IC card, or downloaded via the communication lines. In addition, computer-readable media such as DVD-ROM or CD-ROM storing the data disclosed in the embodiments can be distributed to users as a package product.

A general description of the present invention as well as preferred embodiments of the invention has been set forth above. It is to be expressly understood, however, the terms described above are for purpose of illustration only and are not intended as definitions of the limits of the invention. Those skilled in the art to which the present invention pertains will recognize and be able to practice other variations in the system, device, and methods described that fall within the teachings of this invention. Accordingly, all such modifications are deemed to be within the scope of the invention.

What is claimed is:

1. A recipe providing system, comprising:
a recipe providing device for providing a recipe, and
a client device being interconnected to the recipe providing device;
wherein the client device comprises:
means for requesting recipe data to the recipe providing device by presenting a recipe requirement; and
means for receiving recipe data from the recipe providing device;
wherein the recipe providing device comprises:
a recipe element data storing unit for storing plural of recipe element data to be utilized for generating recipe data;
means for generating recipe data for a plurality of completed recipes by retrieving the recipe element data from the recipe element data storing unit based on the recipe requirement presented by the client device; and
means for transmitting the generated recipe data to the client device;
wherein the plural of recipe element data are arranged in at least three separate hierarchy data, said three separate hierarchy data are composed of recipe element data of finished-dish as a higher hierarchy, recipe element data of intermediate material as intermediate hierarchy corresponding at a-part way of the cooking process of going from the material to the finished-dish and recipe element data of material as a lower hierarchy; said recipe element data of material has link information to more than one recipe element data of finished-dish and/or more than one recipe element data of intermediate material for which the material is used; and said recipe element data of intermediate material has link information to more than one recipe element data of finished-dish for which the intermediate material is used;
wherein said at least three separate hierarchy data each contain different parts of the recipe element data that are combined to generate the recipe data for said plurality of completed recipes; and
wherein said means for generating recipe data includes a processor that combines together said at least three separate hierarchy data based on said link information as different chronological parts of a completed recipe.

2. A recipe providing device for providing a recipe comprising:
a recipe element data storing unit for storing plural of recipe element data to be utilized for generating recipe data;
means for generating recipe data for a plurality of completed recipes by retrieving the recipe element data from the recipe element data storing unit based on an inputted recipe requirement; and
means for outputting the generated recipe data;
wherein the plural of recipe element data are arranged in at least three separate hierarchy data, said three separate hierarchy data are composed of recipe element data of finished-dish as a higher hierarchy, recipe element data of intermediate material as intermediate hierarchy corresponding at a part-way of the cooking process of going from the material to the finished-dish and recipe element data of material as a lower hierarchy; said recipe element data of material has link information to more than one recipe element data of finished-dish and/or more than one recipe element data of intermediate material for which the material is used; and said recipe element data of intermediate material has link information to more than one recipe element data of finished-dish for which the intermediate material is used;
wherein said at least three separate hierarchy data each contain different parts of the recipe element data that are combined to generate the recipe data for said plurality of completed recipes; and
wherein said means for generating recipe data includes a processor that combines together said at least three separate hierarchy data based on said link information as different chronological parts of a completed recipe.

3. A recipe providing device for providing a recipe comprising:
a memory for storing plural of recipe element data to be utilized for generating recipe data; and
a central processing unit (CPU);
wherein the CPU to execute the procedures of:
generating recipe data for a plurality of completed recipes by retrieving the recipe element data from the memory based on an inputted recipe requirement; and
outputting the generated recipe data;
wherein the plural of recipe element data are arranged in at least three separate hierarchy data, said three separate hierarchy data are composed of recipe element data of finished-dish as a higher hierarchy, recipe element data of intermediate material as intermediate hierarchy corresponding at a part-way of the cooking process of going from the material to the finished-dish and recipe element data of material as a lower hierarchy; said recipe element data of material has link information to more than one recipe element data of finished-dish and/or more than one recipe element data of intermediate material for which the material is used; and said recipe element data of intermediate material has link information to more than one recipe element data of finished-dish for which the intermediate material is used;
wherein said at least three separate hierarchy data each contain different parts of the recipe element data that are combined to generate the recipe data for said plurality of completed recipes; and
wherein said CPU generates recipe data by combining together said at least three separate hierarchy data based on said link information as different chronological parts of a completed recipe.

4. A home electric appliance incorporating the recipe providing device according to one of claim 2.

5. A non-transitory computer readable medium having stored thereon the computer program for a recipe data providing device,
wherein the plural of recipe element data are arranged in at least three separate hierarchy data, said three separate hierarchy data are composed of recipe element data of finished-dish as a higher hierarchy, recipe element data of intermediate material as intermediate hierarchy corresponding at a part-way of the cooking process of going from the material to the finished-dish and recipe element data of material as a lower hierarchy; said recipe element data of material has link information to more than one recipe element data of finished-dish and/or more than one recipe element data of intermediate material for which the material is used; and said recipe element data of intermediate material has link information to more than one recipe element data of finished-dish for which the intermediate material is used:
wherein the program is implemented in a computer and to cause the computer to perform:

generating recipe data for a plurality of completed recipes by retrieving recipe element data from a recipe element data storing unit based on an inputted recipe requirement;

outputting the generated recipe data;

wherein said at least three separate hierarchy data each contain different parts of the recipe element data that are combined to generate the recipe data for said plurality of completed recipes; and wherein the program causes said computer to perform said generating recipe data with a processor that combines together said at least three separate hierarchy data based on said link information as different chronological parts of a completed recipe.

6. The non-transitory computer readable medium according to claim 5, wherein the plural of recipe element data further comprises recipe element data for kitchen utensil.

7. The non-transitory computer readable medium according to claim 5, wherein the recipe requirement further includes finished-dish name information.

8. The non-transitory computer readable medium according to claim 5, wherein the recipe element data further comprises information indicating a local feature of the recipe element; wherein the recipe requirement further includes a local information; and wherein said generating recipe data includes retrieving the recipe element data by further considering both the information indicating a local feature and the local information in the recipe requirement data, and generating the recipe data from the retrieved recipe element data.

9. The non-transitory computer readable medium according to claim 5, wherein the recipe element data further comprises information indicating a vendor of the recipe element; wherein the recipe requirement further includes vendor information; and wherein t-he said generating recipe data generating includes retrieving the recipe element data by further considering both the information indicating a vendor and the vendor information, and generating the recipe from the retrieved recipe element data.

10. The non-transitory computer readable medium according to claim 5, wherein the recipe element data further comprises information indicating a seasonality of the recipe element; and wherein generating recipe data includes retrieving the recipe element data by further considering the information indicating a seasonality, and generating the recipe from the retrieved recipe element data.

11. The non-transitory computer readable medium according to claim 5, wherein the recipe element data further comprises cooking process information of the recipe element that represents the cooking process by means of sound and/or picture.

12. The non-transitory computer readable medium according to claim 5, wherein the recipe element data further comprises a process sequence information that represents process sequence among plural of recipe elements in the case in which those recipe elements are on the same hierarchy and they have link information to same higher hierarchy recipe element data.

13. The non-transitory computer readable medium according to claim 5, wherein the recipe requirement further comprises substitution rule information; and said generating recipe data includes retrieving the recipe element data based on the recipe requirement, substituting the retrieved recipe element data for other recipe element data based on tone substitution rule information and recipe element substitution data, and generating the recipe data from the retrieved and substituted recipe element data.

14. A non-transitory computer readable medium having stored thereon computer readable recipe data including plural of recipe element data, comprising:

recipe element data storage area for separately storing the plural of recipe element data by sorting recipe element data of finished-dish as a separate higher hierarchy, recipe element data of intermediate material as a separate intermediate hierarchy corresponding at a part-way of the cooking process of going from the material to the finished-dish and recipe element data of material as a separate lower hierarchy; and link information storage area for storing link information by correlating the link information with the recipe element data storage area for the material and the link information is to link to more than one recipe element data of finished-dish and/or more than one recipe element data of intermediate material for which the material is used;

wherein said separate higher hierarchy, said separate intermediate hierarchy and said separate lower hierarchy each contain different parts of the recipe element data that are combined to generate recipe data for a plurality of completed recipes; and wherein said computer readable medium is configured to cause a computer having a processor to combine together said separate higher hierarchy, said separate intermediate hierarchy and said separate lower hierarchy based on said link information as different chronological parts of a completed recipe.

15. A method for providing a recipe by using a computer, wherein the recipe comprises plural of recipe element data for generating a recipe;

wherein the plural of recipe element data are arranged in at least three separate hierarchy data, said three separate hierarchy data are composed of recipe element data of finished-dish as a higher hierarchy, recipe element data of intermediate material as intermediate hierarchy corresponding at a part-way of the cooking process of going from the material to the finished-dish and recipe element data of material as a lower hierarchy; said recipe element data of material has link information to more than one recipe element data of finished-dish and/or more than one recipe element data of intermediate material for which the material is used; and said recipe element data of intermediate material has link information to more than one recipe element data of finished-dish for which the intermediate material is used; and wherein the method comprising the steps of:

retrieving the recipe element data of finished-dish and the recipe element data of material having a link information to said recipe element data of finished-dish based on a designated finished-dish name and the link information;

generating recipe data for a plurality of completed recipes from the retrieved recipe element data of finished-dish and the retrieved recipe element data of material, wherein said at least three separate hierarchy data each contain different parts of the recipe element data that are combined to generate the recipe data for said plurality of completed recipes, including using a processor to combine together said at least three separate hierarchy data based on said link information as different chronological parts of a completed recipe; and outputting the generated recipe data.

* * * * *